United States Patent
Chen

(10) Patent No.: US 12,027,326 B2
(45) Date of Patent: Jul. 2, 2024

(54) BACKLIT MODULE AND ILLUMINATED KEYSWITCH STRUCTURE

(71) Applicant: Darfon Electronics Corp., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/343,881

(22) Filed: Jun. 29, 2023

(65) Prior Publication Data
US 2023/0341613 A1 Oct. 26, 2023

Related U.S. Application Data

(63) Continuation-in-part of application No. 18/052,233, filed on Nov. 3, 2022.
(Continued)

(30) Foreign Application Priority Data

Nov. 5, 2021 (TW) ................................. 110141391
May 4, 2023 (TW) ................................. 112116626

(51) Int. Cl.
*H01H 13/83* (2006.01)
(52) U.S. Cl.
CPC ....... *H01H 13/83* (2013.01); *H01H 2219/044* (2013.01); *H01H 2219/06* (2013.01); *H01H 2219/062* (2013.01)
(58) Field of Classification Search
CPC ....... H01H 2219/036; H01H 2219/044; H01H 2219/06; H01H 2219/062; H01H 2219/014
See application file for complete search history.

(56) References Cited

U.S. PATENT DOCUMENTS

| 10,234,619 | B2 * | 3/2019 | Chen .................... G02B 6/0055 |
| 2019/0027326 | A1 * | 1/2019 | Tsai ....................... H03K 17/98 |

(Continued)

FOREIGN PATENT DOCUMENTS

| CN | 107818884 A | * | 3/2018 | ........... H01H 13/702 |
| CN | 108122703 A | * | 6/2018 | ........... G02B 6/0055 |

(Continued)

OTHER PUBLICATIONS

TW Office Action dated Dec. 22, 2023 in Taiwan application No. 112116626.

*Primary Examiner* — Alexander K Garlen
(74) *Attorney, Agent, or Firm* — McClure, Qualey & Rodack, LLP

(57) ABSTRACT

A backlit-module-embedded illuminated keyswitch structure includes a baseplate, a mask film disposed below the baseplate and having a first coating for substantially reflecting a light and a second coating for substantially blocking the light, a light guide sheet at one side of the mask film and having a light source hole, and a reflective layer at one side of the light guide sheet opposite to the mask film. The second coating includes a second main coating region and a plurality of second coating sub-regions, which extends outward from the second main coating region and is arranged along the periphery of the second main coating region to form a plurality of intermediary regions therebetween. The first coating and the second coating are disposed right above the light source hole. The first coating is at least partially located in the intermediary regions.

19 Claims, 15 Drawing Sheets

Related U.S. Application Data

(60) Provisional application No. 63/378,379, filed on Oct. 5, 2022.

(56) References Cited

U.S. PATENT DOCUMENTS

| | | | |
|---|---|---|---|
| 2020/0365350 A1* | 11/2020 | Yen | H01H 13/83 |
| 2021/0082642 A1* | 3/2021 | Ho | H01H 13/705 |
| 2022/0293356 A1* | 9/2022 | Wu | G02B 6/0021 |
| 2022/0319783 A1 | 10/2022 | Liu et al. | |

FOREIGN PATENT DOCUMENTS

| | | |
|---|---|---|
| TW | 202203278 A | 1/2022 |
| TW | M626407 U | 5/2022 |
| TW | 202238648 A | 10/2022 |

\* cited by examiner

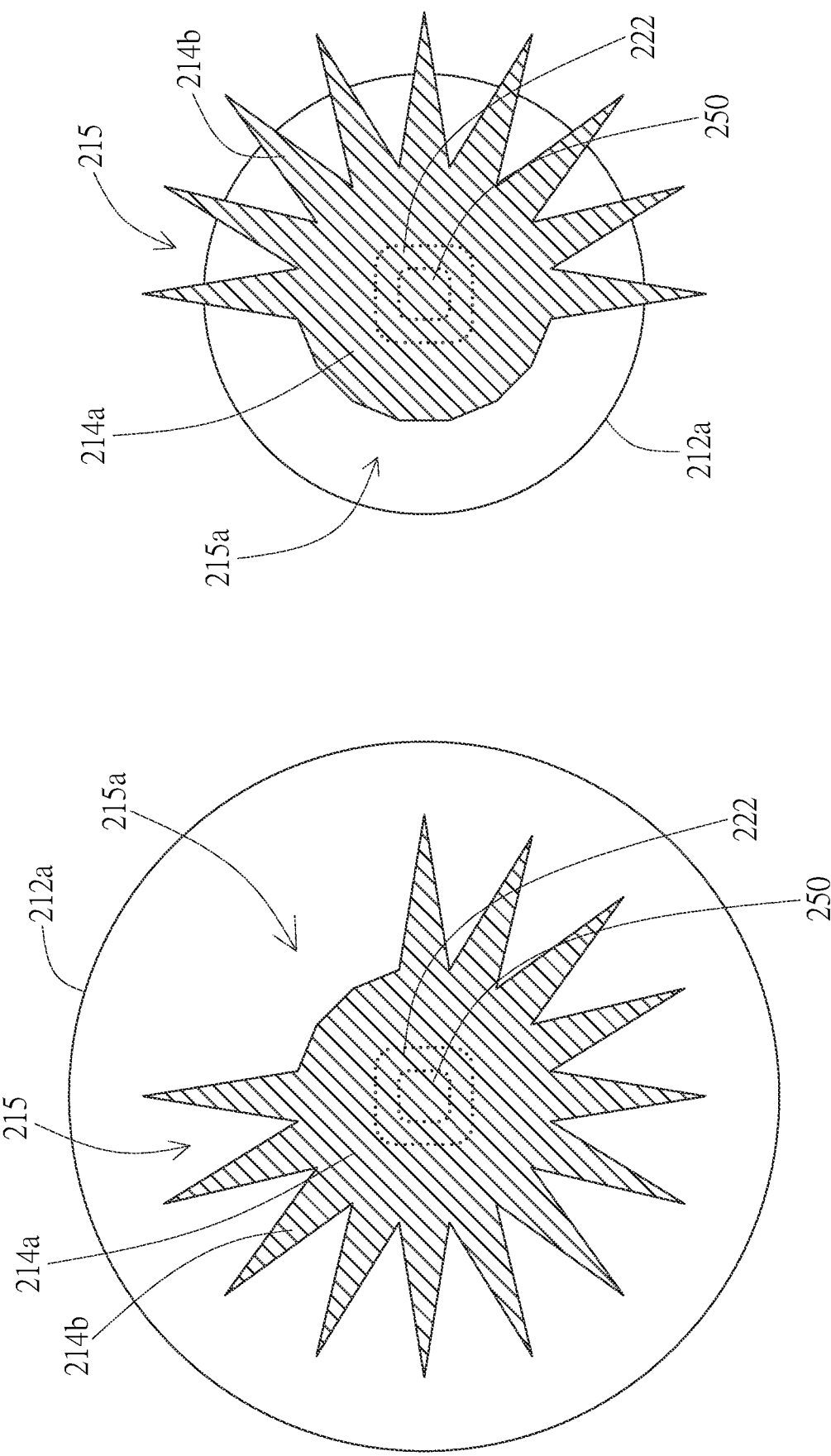

BACKLIT MODULE AND ILLUMINATED KEYSWITCH STRUCTURE

CROSS-REFERENCE TO RELATED APPLICATION

This application is a continuation in part of U.S. application Ser. No. 18/052,233, filed on Nov. 3, 2022, which claims the benefit of Taiwan patent application No. 110141391, filed on Nov. 5, 2021, and also claims the priority benefits of US provisional application Ser. No. 63/378,379, filed Oct. 5, 2022, and Taiwan patent application No. 112116626, filed on May 4, 2023. The entirety of the mentioned above patent applications is hereby incorporated by reference herein and made a part of this specification.

BACKGROUND OF THE INVENTION

1. Field of the Invention

The invention generally relates to a keyswitch structure. Particularly, the invention relates to an illuminated keyswitch structure and a backlit module thereof.

2. Description of the Prior Art

Currently, in order to increase the brightness of the illuminated keyswitch, a single keyswitch has been equipped with a dedicated light source under the baseplate to emit light upward. However, such structures usually have the problem of uneven lighting; for example, the character of the keycap corresponding to the light source is too bright, while the characters away from the light source are too dark.

In addition, the keycap outline halo is also one of the functions of the backlit structure to provide the recognition of keycap boundary. However, the above-mentioned configuration will make the keycap outline halo uneven or too dark, so the keycap characters and keycap boundaries on the keyboard are not easy to recognize, and it is difficult to achieve the consistent luminance uniformity.

SUMMARY OF THE INVENTION

It is an object of the invention to provide an illuminated keyswitch structure and a backlit module thereof, which have a designed coating layout to effectively modulate the light output from the region right above the light source, so as to improve the problem of locally over brightness of the keycap, and further improve the luminance uniformity.

It is another object of the invention to provide an illuminated keyswitch structure and a backlit module thereof, which incorporate the coatings of different optical properties, not only to effectively modulate the light output from the region right above the light source, but also to recycle light as much as possible, so as to improve the luminance uniformity and the brightness.

In an embodiment, the invention provides a backlight module including a mask film having a first coating configured to substantially reflect a light and a second coating configured to substantially block the light, a light guide sheet disposed at one side of the mask film, the light guide sheet having a light source hole, and a reflective layer disposed at one side of the light guide sheet opposite to the mask film, the reflective layer having an opening communicating with the light source hole, wherein the second coating includes a second main coating region and a plurality of second coating sub-regions; the plurality of second coating sub-regions extends outward from the second main coating region and is arranged along a periphery of the second main coating region to form a plurality of intermediary regions between the plurality of second coating sub-regions; the first coating and the second coating are disposed right above the light source hole; at least a portion of the first coating is located in the plurality of intermediary regions.

In an embodiment, the first coating includes a first main coating region, and a vertical projection of the second main coating region and a vertical projection of the plurality of second coating sub-regions on the first coating are completely located within the first main coating region.

In an embodiment, a first intermediary region of the plurality of intermediary regions is larger than the rest of the plurality of intermediary regions.

In an embodiment, the second coating has a second hole, and the second hole is disposed in the second main coating region.

In an embodiment, the first coating has a first hole overlapping the second hole.

In an embodiment, a vertical projection of the second hole on the light guide sheet is located within the light source hole.

In an embodiment, a vertical projection of the second hole on the light guide sheet is located outside of the light source hole.

In an embodiment, the first coating includes a first main coating region. The vertical projection of the second main coating region on the first coating is completely located within the first main coating region. The vertical projection of the plurality of second coating sub-regions on the first coating is at least partially located outside of the first main coating region.

In an embodiment, a first intermediary region of the plurality of intermediary regions is larger than the rest of the plurality of intermediary regions.

In an embodiment, the first coating further includes a plurality of first coating sub-regions. The plurality of first coating sub-regions extends outward from the first main coating region and is arranged along a periphery of the first main coating region and disposed in the first intermediary region to form a plurality of light permeable regions between the plurality of first coating sub-regions.

In an embodiment, the first coating further includes a plurality of first coating sub-regions. The plurality of first coating sub-regions extends outward from the first main coating region and is arranged along a periphery of the first main coating region and disposed in the plurality of intermediary regions to form a plurality of light permeable regions between the plurality of first coating sub-regions.

In an embodiment, the plurality of first coating sub-regions extends outward beyond the plurality of second coating sub-regions.

In an embodiment, the first main coating region and the second main coating region are concentric circles. The radius of the plurality of first coating sub-regions is larger than or equal to the radius of the plurality of second coating sub-regions.

In an embodiment, the backlit module of the invention further includes a driving circuit board disposed below the light guide sheet and a light-emitting element fixed on the driving circuit board and located in the light source hole, wherein a vertical projection of the light-emitting element on the light guide sheet is located within a vertical projection of the second main coating region on the light guide sheet.

In an embodiment, the plurality of second coating sub-regions is disposed symmetrically with respect to the light-emitting element, and the plurality of second coating sub-regions overlaps the light source hole.

In an embodiment, a vertical projection of the second main coating region on the light guide sheet is located within the light source hole.

In an embodiment, the second coating is made of a coating material the same as the first coating.

In another embodiment, the invention provides a backlit module including a mask film having a first coating configured to substantially reflect a light, a light guide sheet disposed at one side of the mask film, the light guide sheet having a light source hole, a reflective layer disposed at one side of the light guide sheet opposite to the mask film, and a light-emitting element passing through the reflective layer to be located in the light source hole, wherein the first coating includes a first main coating region and a plurality of first coating sub-regions; the plurality of first coating sub-regions extends outward from the first main coating region and is arranged along a periphery of the first main coating region to form a plurality of intermediary regions between the plurality of first coating sub-regions; the plurality of intermediary regions allows the light to directly pass therethrough, and wherein the light-emitting element and the first main coating region overlap with each other in a vertical direction; the plurality of first coating sub-regions at least partially extends beyond the light source hole to be outside thereof.

In another embodiment, the invention provides an illuminated keyswitch structure including the backlit module described above and a baseplate disposed over the backlit module. The baseplate has a light hole corresponding to the light source hole. The backlit module is configured to project light toward the light hole. The second coating is disposed closer to the baseplate than the first coating is. The vertical projection of the second main coating region on the baseplate is located within the light hole.

In an embodiment, the vertical projection of the light source hole on the baseplate is located within the vertical projection of the second main coating region.

Compared with the prior art, the illuminated keyswitch structure and the backlit module of the invention have a designed coating layout, which can effectively modulate the light output from the region right above the light source and can recycle most of light, so as to improve the luminance uniformity and the brightness.

BRIEF DESCRIPTION OF THE DRAWINGS

FIG. 4A to FIG. 10B are schematic plan views of the coating layout in various embodiments of the invention.

DETAILED DESCRIPTION OF THE PREFERRED EMBODIMENT

The invention mainly involves the complex application of the coating design of the mask film in a sophisticated optical system (e.g. an illuminated keyboard and an illuminated keyswitch with a backlit module). The invention is designed to modulate the mask film and the associated optical elements to achieve the ultimate luminous effect of the backlit module for a single keyswitch or even the entire keyboard and to promote the luminance uniformity. Therefore, it is necessary to understand the invention concept in the embodiments of the invention, and how to optimize the backlit module, the illuminated keyswitch structure, and the illuminated keyboard of the invention in consideration of multiple variables and restrictions will be described in detail.

In pursuit of extremely thin electronic devices, such as laptop computer and keyboard, the illuminated keyswitch and the backlit module thereof are intensively integrated in a small space. With the miniaturization of light sources, reduction of luminous efficacy, and modification of optical materials year by year, a slight change of different light source or optical elements will cause a significant change in the luminous effect. Therefore, the backlit design for key-switch must consider complex technical issues, which cannot be solved by simple design choices.

Figure 1A:
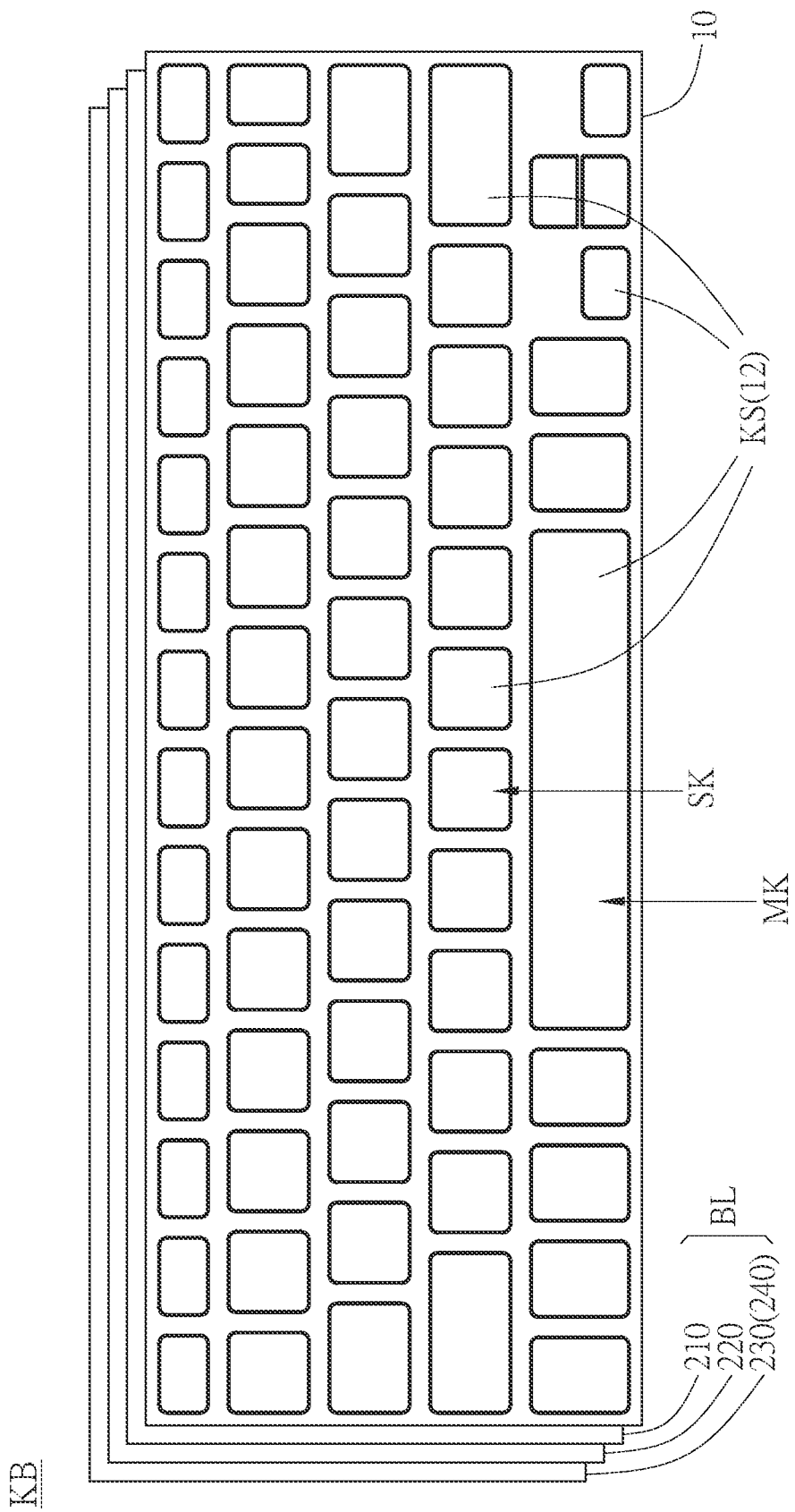
FIG. 1A is a schematic view of the stack of the illuminated keyboard in an embodiment of the invention.

Referring to FIG. 1A, FIG. 1A is a schematic view of the stack of the illuminated keyboard in an embodiment of the invention. In an embodiment, the illuminated keyboard KB of the invention includes a plurality of keyswitches KS (such as square keyswitches SK or multiple keyswitches MK) and a backlit module BL. Each keyswitch KS (e.g. the illuminated keyswitch structure 1 in FIG. 1B) includes a keycap 12, an up-down lift structure 14, a portion of a membrane circuit board 16, a restoring member 18, and a portion of a baseplate 10. For the illuminated keyboard KB, the backlit module BL includes a mask film 210, a light guide sheet 220 and a driving circuit board 240, and the driving circuit board 240 can include a reflective layer 230 and a light-emitting element 250 disposed thereon.

Figure 1B:
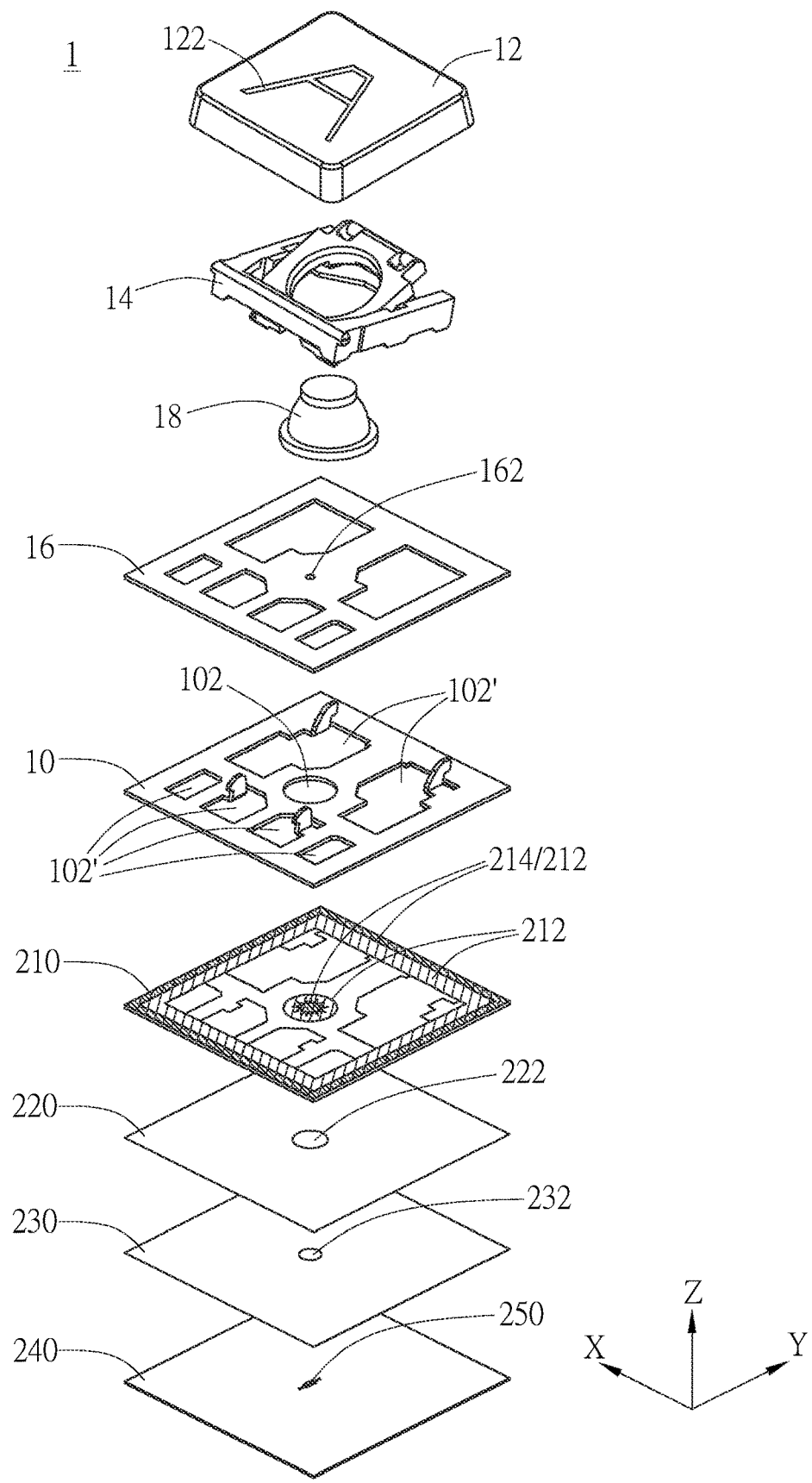
FIG. 1B is a schematic exploded view of the illuminated keyswitch structure in an embodiment of the invention.
Figure 2:
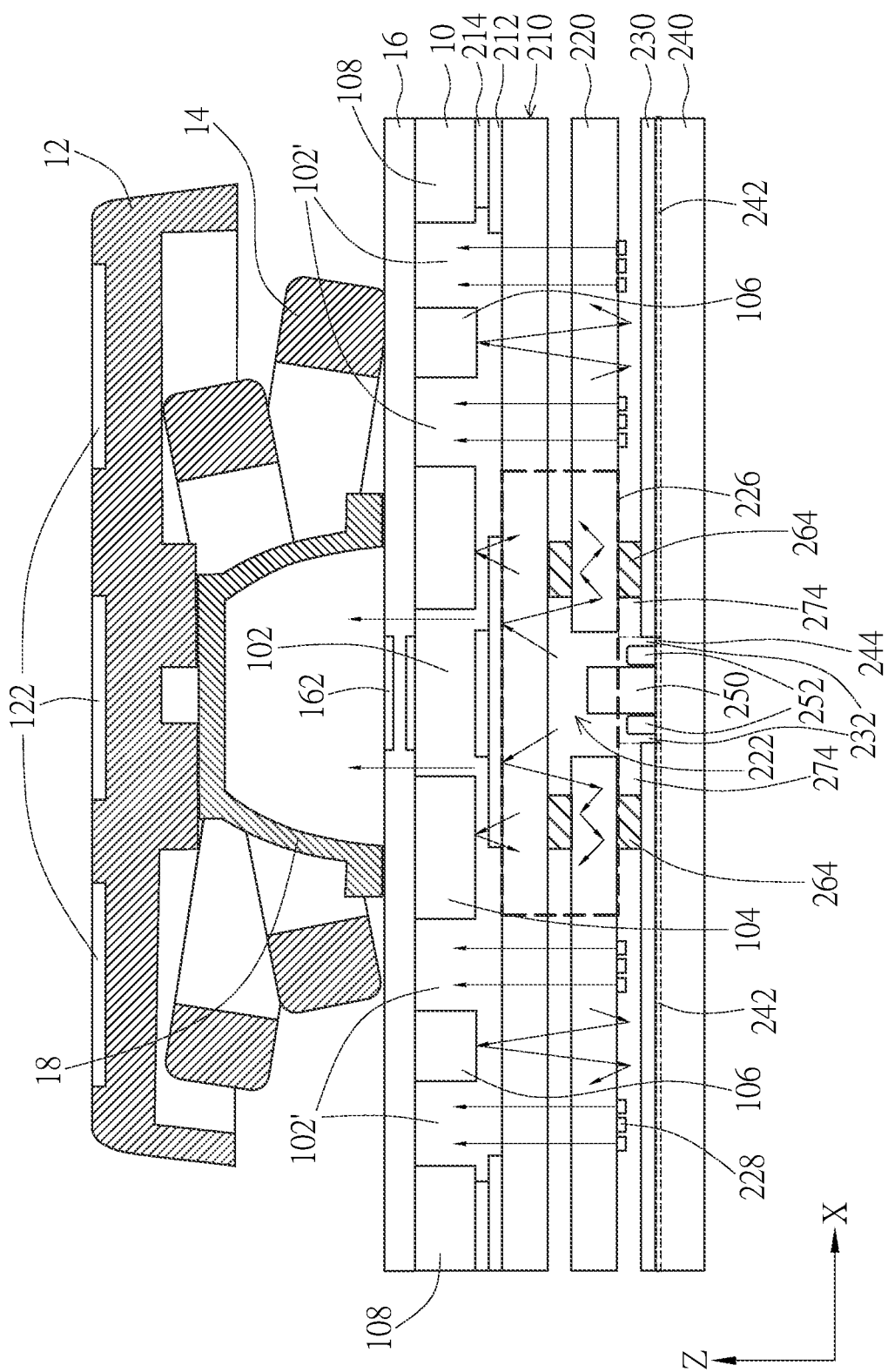
FIG. 2 is a schematic cross-sectional view of the illuminated keyswitch structure in an embodiment of the invention.

Referring to FIG. 1B and FIG. 2, FIG. 1B is a schematic exploded view of the illuminated keyswitch structure in an embodiment of the invention, and FIG. 2 is a schematic cross-sectional view of the illuminated keyswitch structure in an embodiment of the invention. For a single keyswitch structure, in an embodiment, the illuminated keyswitch structure 1 of the invention includes the baseplate 10, the keycap 12, the up-down lift structure 14, the membrane circuit board 16, the restoring member 18, the mask film 210, the light guide sheet 220, the reflective layer 230, the driving circuit board 240, and the light-emitting element 250. The keycap 12 is disposed over the baseplate 10 and has a light permeable portion 122 (e.g. one or more light permeable characters). The up-down lift structure 14 is connected between the baseplate 10 and the keycap 12 and configured to support the up-down movement of the keycap 12 relative to the baseplate 10. The membrane circuit board 16 is disposed under the keycap 12 and preferably above the baseplate 10. The membrane circuit board 16 has a switch 162 (represented by a circle in FIG. 1B). The membrane circuit board 16 has a multi-layered structure, and the switch circuit is formed on one or more layers thereof. When the keycap 12 is pressed, the switch 162 of the membrane circuit board 16 will be conducted. The restoring member 18 is disposed between the keycap 12 and the baseplate 10 and configured to provide a restoring force to enable the keycap 12 to move upward relative to the baseplate 10 to the non-pressed position when the pressing force is released. In this embodiment, the restoring member 18 can be embodied as an elastic member (e.g. rubber dome) and disposed corresponding to the switch 162. When the keycap 12 is pressed and moves downward to compress the restoring member 18, the restoring member 18 can trigger the switch 162, but not limited thereto, The switch 162 can be triggered by a triggering portion, which can be disposed on the restoring member 18, the up-down lift structure 14, or the keycap 12, but not limited thereto. According to practical applications, the restoring member 18 can be embodied as any suitable element, which can provide the restoring force to enable the keycap 12 to return the non-pressed position, such as spring, magnetic member. The switch of the illuminated keyswitch structure 1 is not limited to the switch 162 of the membrane circuit board 16 and can be any suitable switch, which is triggered in response to the downward movement of the keycap 12, such as mechanical switch, magnetic switch, optical switch. In this embodiment, the up-down lift structure 14 can be embodied as a scissors-like up-down lift structure, which has two frames pivotally coupled with each other, and two ends of each frame are movably coupled to the baseplate 10 and the keycap 12, respectively, but not limited thereto. According to practical applications, the up-down lift structure 14 can be embodied as a butterfly up-down lift structure, a cantilever up-down lift structure, etc. The baseplate 10, the keycap 12, the up-down lift structure 14, the membrane circuit board 16, and the restoring member 18 constitute the keyswitch unit of the illuminated keyswitch structure 1.

As shown in FIG. 2, the mask film 210 is disposed below the baseplate 10, and the mask film 210 preferably has a first coating 212 and a second coating 214. The first coating 212 is configured to substantially reflect light, such as the light emitted from the light-emitting element 250, and the second coating 214 is configured to substantially block light. The light guide sheet 220 is disposed at one side of the mask film 210 opposite to the baseplate 10 (e.g. the lower side), and the light guide sheet 220 has a light source hole 222 corresponding to the light hole 102 of the baseplate 10. The reflective layer 230 is disposed at one side of the light guide sheet 220 opposite to the mask film 210 (e.g. the lower side), and the reflective layer 230 has an opening 232, which communicates with the light source hole 222. The light-emitting element 250 is fixed on the driving circuit board 240 by an adhesive layer 252 and is electrically coupled to the light source circuit of the driving circuit board 240. The adhesive layer 252 can be a non-conductive adhesive layer, which is configured to fix the light-emitting element 250 on the driving circuit board 240, instead of the solder paste or other conductive layer, which is configured to fix and electrically connect the light-emitting element 250 to the driving circuit board 240, but not limited thereto. The driving circuit board 240 is disposed below the light guide sheet 220, so the light-emitting element 250 can extend upward into the light source hole 222 of the light guide sheet 220 from below the opening 232 of the reflective layer 230. In an embodiment, the light-emitting element 250 can be a micro light-emitting diode (g LED), which can have a light-emitting pattern from five surfaces, mainly top-lighting, such as 80% of light emitting from the top surface, and the rest of light from four side surfaces, but not limited thereto. The mask film 210, the light guide sheet 220, the reflective layer 230, the driving circuit board 240, and the light-emitting element 250 constitute the backlit unit (or module) of the illuminated keyswitch structure 1, which is configured to project light toward the light hole 102 of the baseplate 10. Moreover, the adhesive layer 252 can be light permeable, and a portion of the reflective layer 230, which surrounds the light-emitting element 250, can be disposed in the light source hole 222, so the reflected light can enter the light guide sheet 220 from the sidewall of the light source hole 222 via the adhesive layer 252 and/or the reflective layer 230 disposed in the light source hole 222, and then travels along the transverse (or horizontal) direction.

Figure 3:
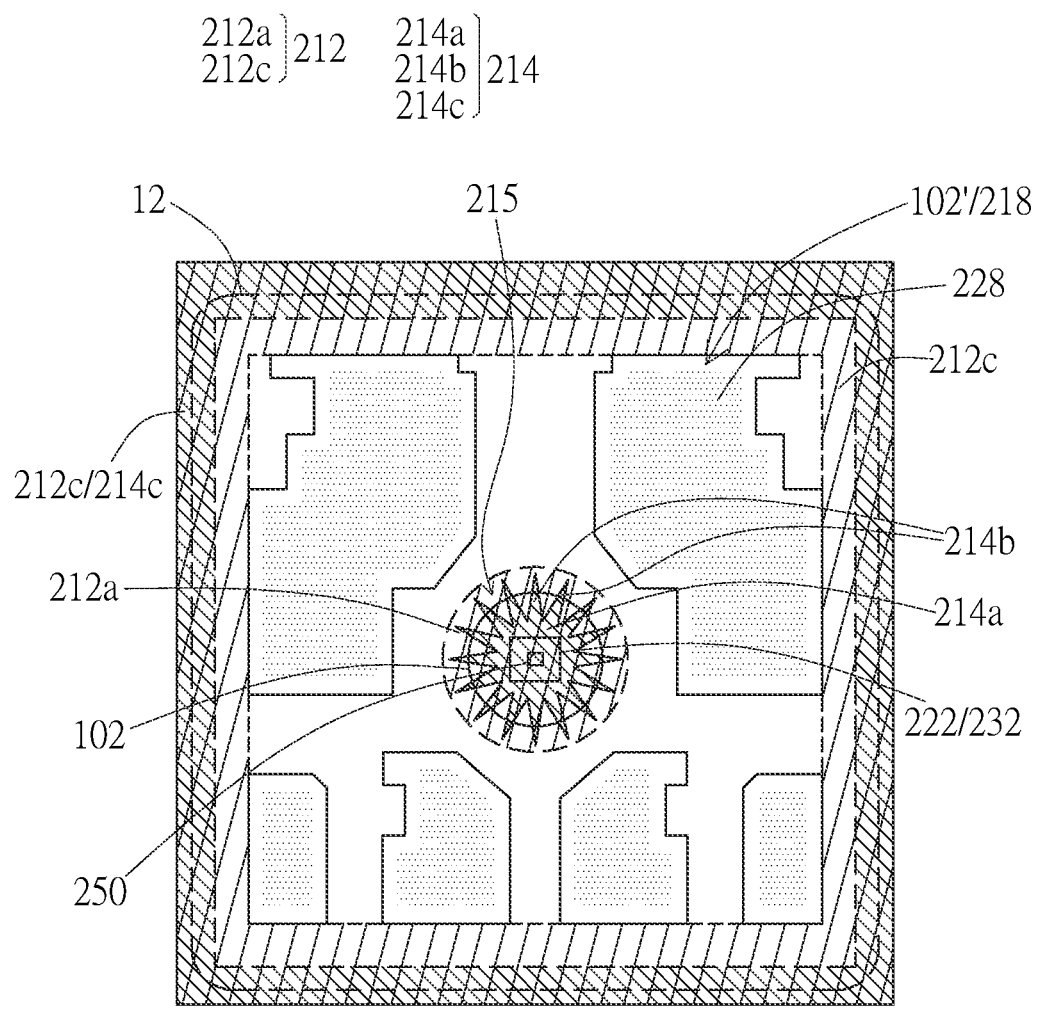
FIG. 3 is a schematic plan view of the stack of certain components of the illuminated keyswitch structure in an embodiment of the invention.
Figure 3A:
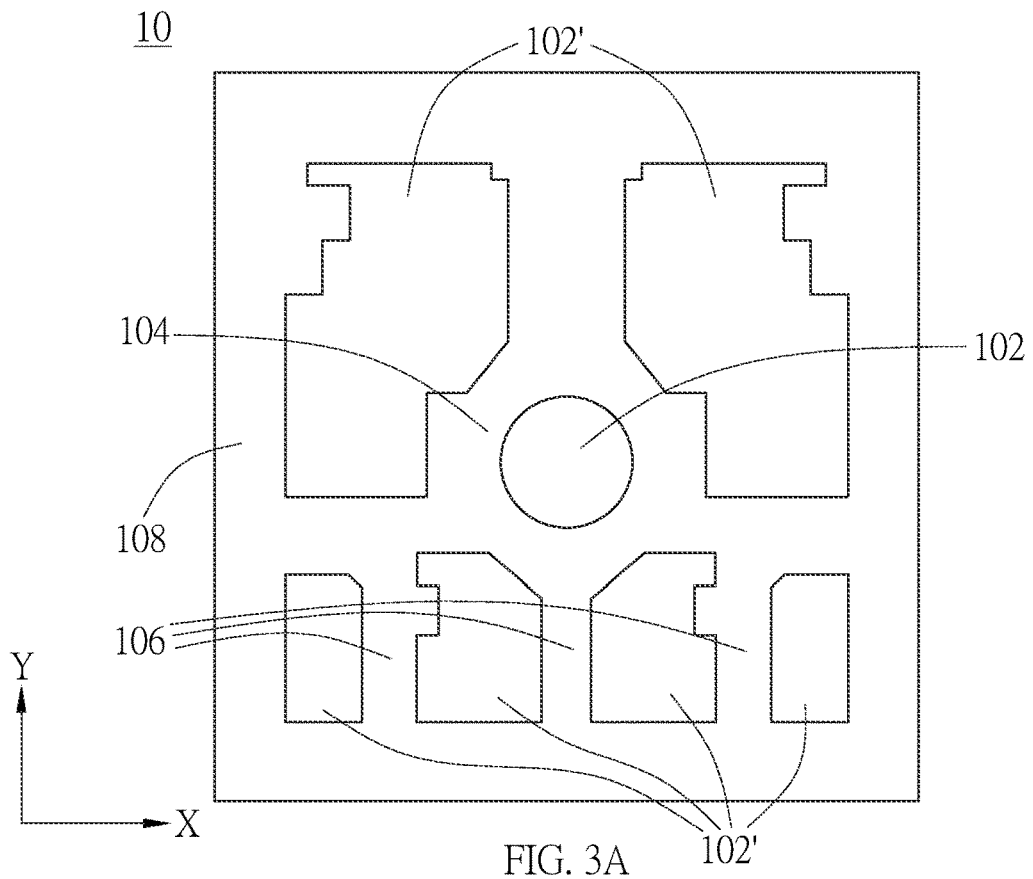
FIG. 3A to FIG. 3D are schematic plan views of the components of FIG. 3, respectively.

Referring to FIG. 3 and FIG. 3A to FIG. 3D, FIG. 3 is a schematic plan view of the stack of certain components (e.g. the baseplate 10, the mask film 210, the light guide sheet 220, the driving circuit board 240 including the reflective layer 230) of the illuminated keyswitch structure in an embodiment of the invention, and FIG. 3A to FIG. 3D are schematic plan views of the components of FIG. 3, respectively. As shown in FIG. 3 and FIG. 3A, the baseplate 10 is disposed on the backlit module (such as on the mask film 210) and can be formed by metal stamping, so the baseplate 10 has a plurality of ribs connected to each other (such as inner rib 104, bridge rib 106, and peripheral rib 108) to define a plurality of holes (such as light hole 102 and peripheral hole 102'). Specifically, the peripheral rib 108 of the baseplate 10 is disposed at the outermost of the baseplate 10, and the peripheral rib 108 can be a frame-like rib or a plurality of ribs connected to each other in a head-to-tail manner to form a ring-shaped configuration. As such, the baseplate 10 can have a frame structure, but not limited thereto. When a plurality of keyswitches are integrated into the keyboard, the baseplate 10 of each keyswitch can be connected by the peripheral rib 108, so as to form a single integral baseplate. The inner rib 104 is disposed at the center or in the neighborhood of the center of the baseplate 10 and configured to define the light hole 102, so the inner rib 104 encloses the light hole 102, and the light hole 102 substantially corresponds to the center or in the neighborhood of the center of the keycap 12. A plurality of the bridge ribs 106 is configured to connect the inner rib 104 and the peripheral rib 108. The bridge ribs 106 are disposed between the inner rib 104 and the peripheral rib 108 to define a plurality of peripheral holes 102', so the peripheral holes 102' substantially correspond to the peripheral portion or corners of the keycap 12. The light hole 102 and the peripheral holes 102' allow the light emitted from the light-emitting element 250 to pass therethrough, so as to illuminate the keycap 12 and thereout of from the light permeable portion 122.

Figure 3B:
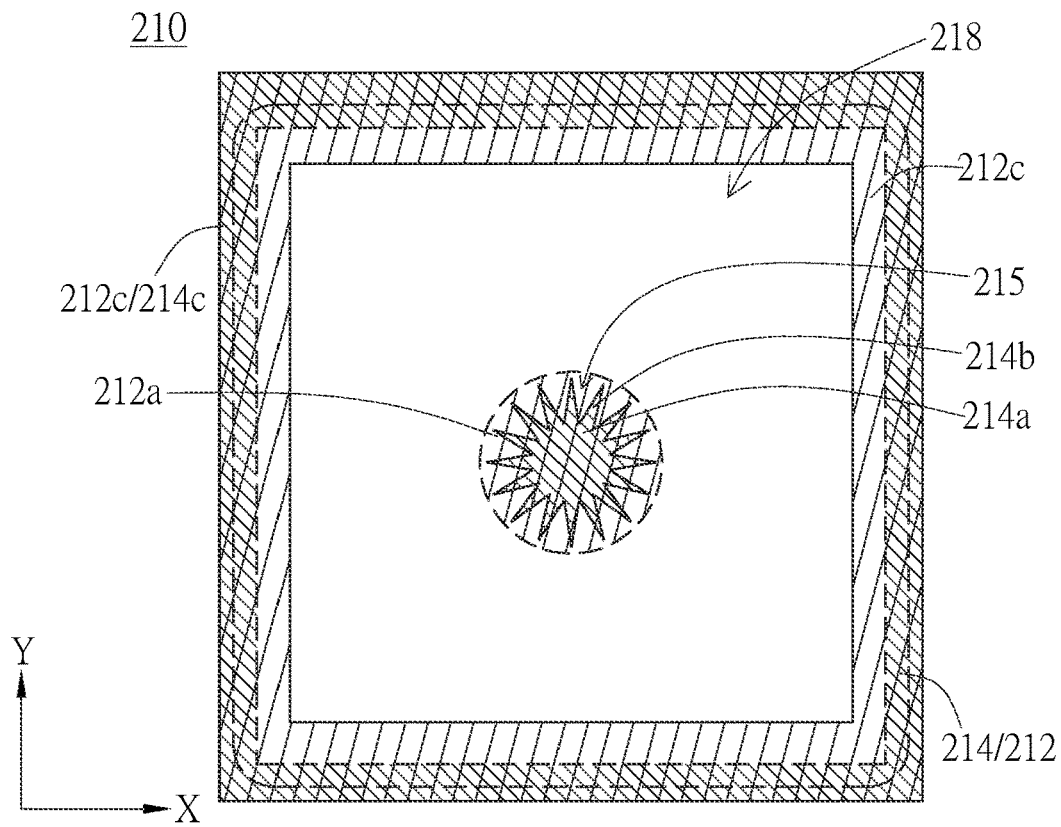

Specifically, as shown in FIG. 3 and FIG. 3B, the mask film 210 can be a light permeable film (such as polyethylene terephthalate (PET) film) with the first coating 212 and the second coating 214 formed by light-blocking materials (coating materials) thereon. In this embodiment, the first coating 212 and the second coating 214 preferably have different light transmittances. As such, the first coating 212 can reflect a major portion of light and allow a small portion of light to pass therethrough (or absorb the small portion of light), and the second coating 214 can substantially block or absorb a major portion of light and allow a small portion of light to pass therethrough (or reflect the small portion of light). For example, in an embodiment, the first coating 212 can be a white ink coating, the second coating 214 can be a black ink coating, and both can be formed by the printing technology, but not limited thereto. Moreover, the first coating 212 and the second coating 214 are preferably disposed right above the light source hole 222, and the second coating 214 is closer to the baseplate 10 than the first coating 212 is (i.e., the first coating 212 is closer to the light guide sheet 220 than the second coating 214 is). As such, a major portion of the upward light can be firstly reflected from the first coating 212, and a small portion of the upward light passing through the first coating 212 is then absorbed by the second coating 214, effectively directing the upward light from the vertical (upward) direction to propagate along the transverse (or horizontal) direction. The first coating 212 and the second coating 214 can be disposed at the same side or different sides of the mask film 210. In an embodiment, as shown in FIG. 2, the first coating 212 and the second coating 214 are disposed at the same side of the mask film 210. For example, the first coating 212 is disposed on the upper surface of the mask film 210, and the second coating 214 is disposed on the upper surface of the mask film 210 and/or on the upper surface of the first coating 212, but not limited thereto. In another embodiment (not shown), the second coating 214 can be disposed on the lower surface of the mask film 210, and the first coating 212 is disposed on the lower surface of the mask film 210 and/or on the lower surface of the second coating 214. In other embodiments (not shown), the first coating 212 and the second coating 214 can be disposed at different sides of the mask film 210. For example, the first coating 212 is preferably disposed on the lower surface of the mask film 210 (i.e., closer to the light guide sheet 220), and the second coating 214 is disposed on the upper surface of the mask film 210 (i.e., closer to the baseplate 10). As such, the upward light is mostly reflected from the first coating 212 and less passes through the first coating 212 to be absorbed by the second coating 214.

It is noted that in the figures (such as FIG. 3, FIG. 3B), the region with left-shaded lines is where the first coating 212 is disposed, and the region with the right-shaded line is where the second coating 214 is disposed. When a region exhibits both of left-shaded lines and right-shaded lines, the region is where the first coating 212 and the second coating 214 are overlappingly disposed, and the first coating 212 is closer to the light guide sheet 220 than the second coating 214 is. In an embodiment, the first coating 212 and the second coating 214 are disposed corresponding to the light hole 102, so the vertical projection of the first coating 212 on the baseplate 10 preferably overlaps the light hole 102 and extends to the inner rib 104. The vertical projection of the second coating 214 on the baseplate 10 is preferably located within the light hole 102, but not limited thereto. According to practical applications (e.g. desired light output), the vertical projection of the first coating 212 (or the second coating 214) on the baseplate 10 can be selectively larger than, equal to, or smaller than the light hole 102 of the baseplate 10, and the size of the light hole 102 is preferably larger than or equal to the size of the light source hole 222.

Specifically, as shown in FIG. 3 and FIG. 3B, the first coating 212 includes a first main coating region 212a. In this embodiment, corresponding to the circle-shaped light hole 102, the first main coating region 212a can be a circle-shaped reflective region, and the size of the first main coating region 212a can be larger than, equal to, or smaller than the size of the light hole 102. The first main coating region 212a is disposed right above the light source hole 222, and the vertical projection of the light source hole 222 on the first coating 212 is preferably located within the first main coating region 212a, but not limited thereto. According to practical applications, the first main coating region 212a can have any suitable shape, such as geometric shape of circle, rectangle or polygon, or irregular shape, not limited to the embodiments.

Figure 4B:
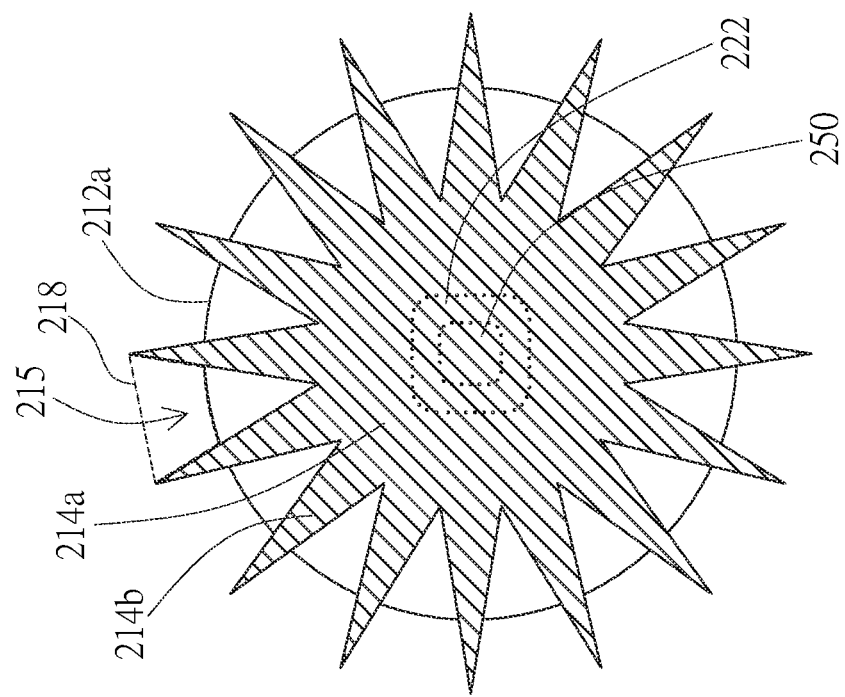
Figure 4A:
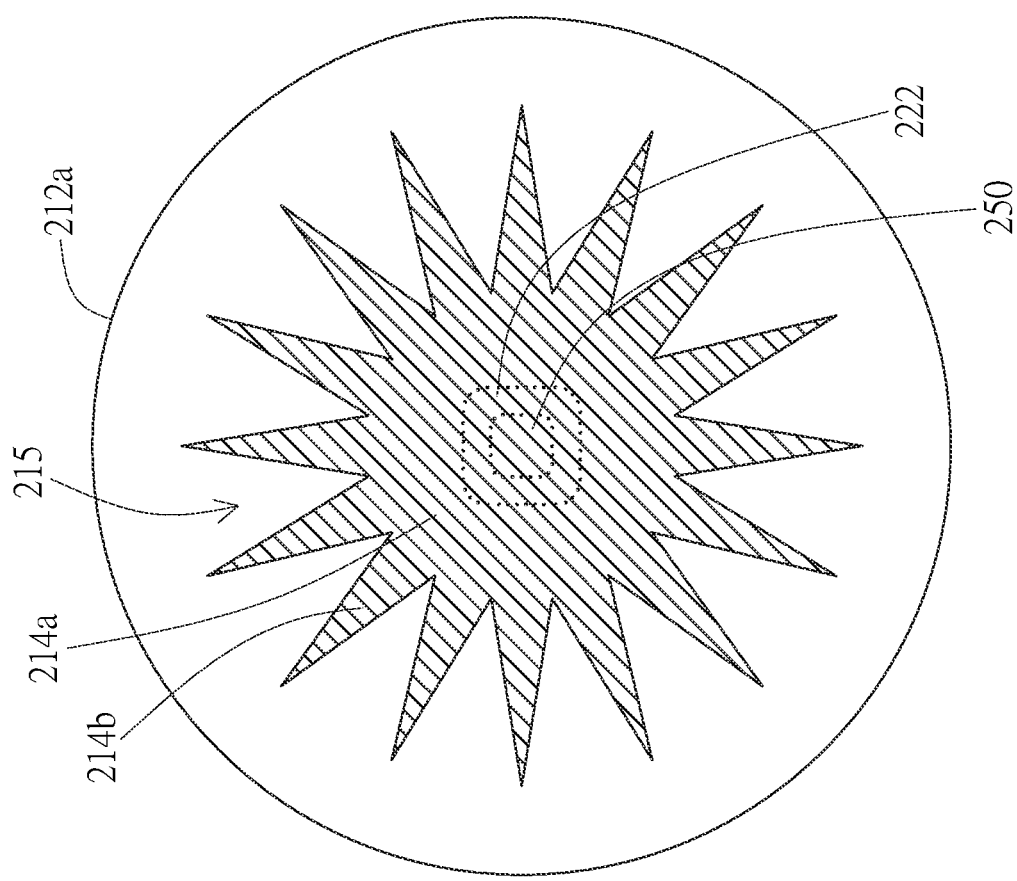

As shown in FIG. 3B and FIG. 4A, the second coating 214 includes a second main coating region 214a and a plurality of second coating sub-regions 214b. The plurality of second coating sub-regions 214b extends outward from the second main coating region 214a and is arranged along a periphery of the second main coating region 214a to form a plurality of intermediary regions 215 between the plurality of second coating sub-regions 214b. Specifically, the plurality of second coating sub-regions 214b and the plurality of intermediary regions 215 are alternately arranged along the periphery of the second main coating region 214a, so as to form a light modulation region around the second main coating region 214a. In this embodiment, the second main coating region 214a can be a circle-shaped light-blocking region, and the plurality of second coating sub-regions 214b is a plurality of triangle-like light-blocking sub-regions arranged along the circumference of the second main coating region 214a. As such, the second main coating region 214a and the plurality of second coating sub-regions 214b constitute a star-shaped pattern, and the intermediary region 215 is disposed between adjacent two second coating sub-regions 214b. In other words, the intermediary region 215 is a portion of the light permeable film of the mask film 210, which is located between adjacent second coating sub-regions 214b and where the light-blocking material of the second coating 214 is not disposed. Correspondingly, the intermediary region 215 has a similar triangular shape (inverted with respect to the second coating sub-region 214b). Since the plurality of second coating sub-regions 214b is arranged around the second main coating region 214a and extends outward along the radial direction, the wide bottom of the intermediary region 215 is away from the second main coating region 214a and larger than the bottom (or arc length) of the second coating sub-region 214b, and the narrow apex of the intermediary region 215 neighbors on the second main coating region 214a. As such, the light modulation region has a ring shape.

In this embodiment, the wide bottoms of the plurality of second coating sub-regions 214b are connected to the second main coating region 214a, and the center line of the apex of each second coating sub-region 214b (such as the angle bisector) preferably passes the center of the second main coating region 214a. In an embodiment, the plurality of second coating sub-regions 214b is preferably identical in shape and size and evenly disposed along the periphery of the second main coating region 214a, so the plurality of intermediary regions 215 is also identical in shape and size, but not limited thereto. According to practical applications, the second main coating region 214a can have any suitable shape, such as geometric shape of circle, rectangle or polygon, or irregular shape, and the second coating sub-region 214b can also have any suitable shape, such as a shape of triangle, cone, rectangle, trapezoid, polygon, petal, or irregular shape.

The second main coating region 214a and the plurality of second coating sub-regions 214b are disposed corresponding to the light hole 102 and the light source hole 222. The vertical projection of the second main coating region 214a on the baseplate 10 is preferably located within the light hole 102, and the second main coating region 214a preferably completely covers the light-emitting element 250. In other words, the light hole 102 can be larger than or equal to the light source hole 222, and the vertical projection of the light-emitting element 250 on the light guide sheet 220 is preferably located within the vertical projection of the second main coating region 214a on the light guide sheet 220. The radius of the second coating sub-region 214b (i.e., the distance from the distal end of the second coating sub-region 214*b* which is away from the second main coating region 214*a* (e.g. the apex) to the center (of circle) of the second main coating region 214*a*) can be larger than, equal to, or smaller than the radius of the light hole 102 (i.e., the rim of the light hole 102 to the center thereof). For example, when the radius of the second coating sub-region 214*b* is larger than the radius of the light hole 102, the second coating sub-region 214*b* is partly located within the light hole 102 and partly extends outside of the light hole 102. When the radius of the second coating sub-region 214*b* is equal to the radius of the light hole 102, the second coating sub-region 214*b* is located within the light hole 102 and its distal end (i.e., the apex) overlaps the rim of the light hole 102. When the radius of the second coating sub-region 214*b* is smaller than the radius of the light hole 102, the second coating sub-region 214*b* is completely located within the light hole 102, and its distal end (i.e., the apex) is spaced apart from the rim of the light hole 102, i.e., a gap exists therebetween. In an embodiment, the shape and size (length or radius) of the second main coating region 214*a* and the second coating sub-region 214*b* can be determined based on the desired light output of the symbol or character (i.e., the light permeable portion 122) corresponding to the light hole 102. Preferably, the larger the desired light output is, the larger an area of the intermediary region 215 exposed in the light hole 102 is.

The first main coating region 212*a* and the second main coating region 214*a* can be concentric circles with the same or different radii. In an embodiment, taking the light hole 102 of circular shape as an example, the diameter of the first main coating region 212*a* is preferably larger than the diameter of the light hole 102, and the diameter of the light hole 102 is preferably larger than the diameter of the second main coating region 214*a*. In other words, the radius of the first main coating region 212*a* is larger than the radius of the second main coating region 214*a*, so a portion of the first coating 212 (e.g. a portion of the first main coating region 212*a*) is located in the plurality of intermediary regions 215. Specifically, the first main coating region 212*a* and the second main coating region 214*a* preferably overlap with each other and correspond to the light hole 102 of the baseplate 10. In this embodiment, the vertical projection of the second main coating region 214*a* and the vertical projection of the plurality of second coating sub-regions 214*b* on the first coating 212 can be completely located within the first main coating region 212*a*. As such, a portion of the first main coating region 212*a* is exposed from the intermediary region 215 between the adjacent second coating sub-regions 214*b* and does not overlap the second coating sub-regions 214*b*.

Moreover, in addition to the second main coating region 214*a* and the plurality of second coating sub-regions 214*b*, which correspond to the light hole 102, the second coating 214 can further have a second peripheral region 214*c*, which corresponds to the peripheral rib 108 of the baseplate 10. In addition to the first main coating region 212*a*, which is located right below the light hole 102, the first coating 212 can further have a first peripheral region 212*c*, which corresponds to (or overlaps) the peripheral ribs 108 of the baseplate 10, so as to define a light permeable region 218. In this embodiment, the light permeable region 218 can be a continuous region, and the vertical projection of the light permeable region 218 on the baseplate 10 covers the bridge ribs 106 and the peripheral holes 102', but not limited thereto. In another embodiment (not shown), according to practical applications, the vertical projection of the first coating 212 (or the second coating 214) on the baseplate 10 can further overlap the bridge portions 106 to define a plurality of light permeable regions, which corresponds to the peripheral holes 102' in shape, number, and location, but not limited thereto. As shown in FIG. 3B, the portion of the first coating 212 corresponding to the peripheral rib 108 (i.e., the first peripheral region 212*c*) preferably extend beyond the portion of the second coating 214 corresponding to the peripheral rib 108 (i.e., the second peripheral region 214*c*) to be closer to the light hole 102 (i.e., the width thereof is wider), but not limited thereto. In another embodiment, the portion of the first coating 212 corresponding to the peripheral rib 108 can be the same as the portion of the second coating 214 corresponding to the peripheral rib 108 or retreats with respect to the light hole 102 (i.e., the width thereof is narrower).

Figure 3C:
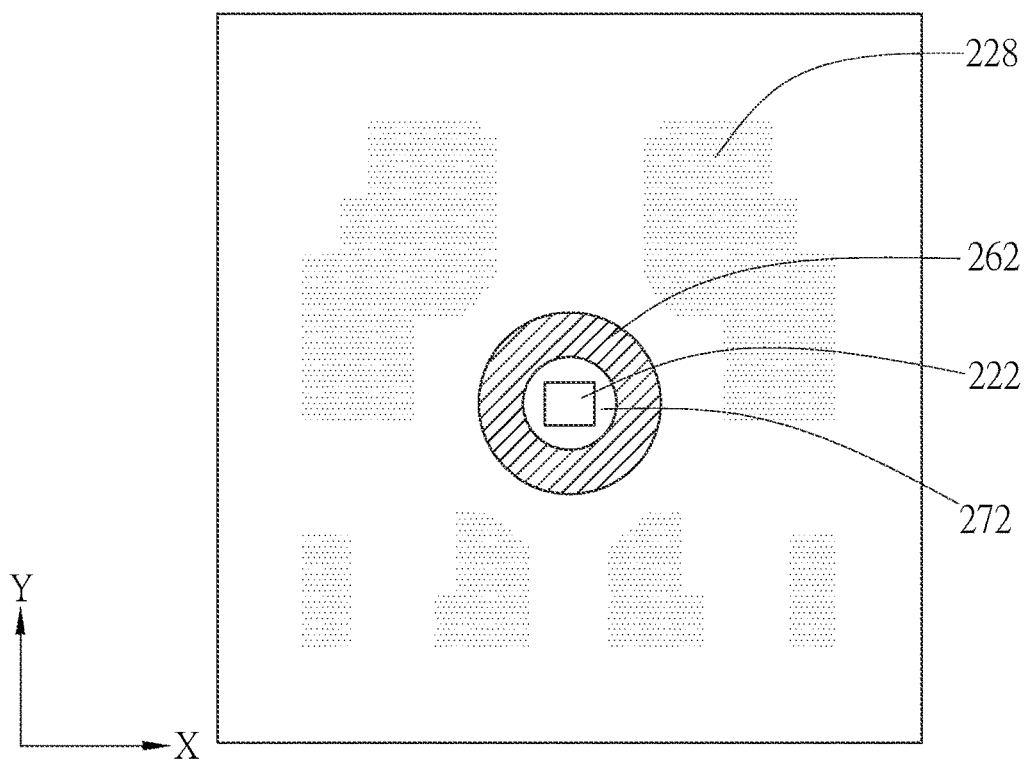

As shown in FIG. 3 and FIG. 3C, the light guide sheet 220 can be a film-like or sheet-like plate, which can be made of any suitable optical materials, such as optical polymers. The light source hole 222 is a through hole penetrating through the light guide sheet 220 in the thickness direction (i.e., Z-axis direction), so the light-emitting element 250 can be located in the light source hole 222. The first main coating region 212*a* of the first coating 212 and the second main coating region 214*a* of the second coating 214 are located right above the light source hole 222. The light guide sheet 220 can further have a plurality of light-exit portions 228 configured to destroy the total reflection of light to emit light upward. The plurality of light-exit portions 228 is preferably disposed corresponding to the peripheral holes 102', but not limited thereto. The light-exit portions 228 can be disposed at any positions for light output as appropriate. As shown in FIG. 3C, a top glue 262 is disposed on the top surface of the light guide sheet 220 and located around the light source hole 222. Specifically, the top glue 262 is configured to connect the mask film 210 and the light guide sheet 220 and located around the light hole 102, so the mask film 210, the light guide sheet 220, and the light-emitting element 250 can be positioned by the top glue 262 to enhance the optical coupling stability. Moreover, the top glue 262 can be formed by optical materials, which are light permeable and have a refractive index closer to that of the light guide sheet 220 than the air. As such, light reflected from the first main coating region 212*a* can enter the light guide sheet 220 at a relatively higher proportion and then propagates in the light guide sheet 220 by total reflection. Moreover, the top glue 262 is spaced apart from the edge of the light source hole 222 of the light guide sheet 220 to form a top clearance region 272 therebetween, i.e., the region around the light source hole 222 without the top glue 262.

Figure 3D:
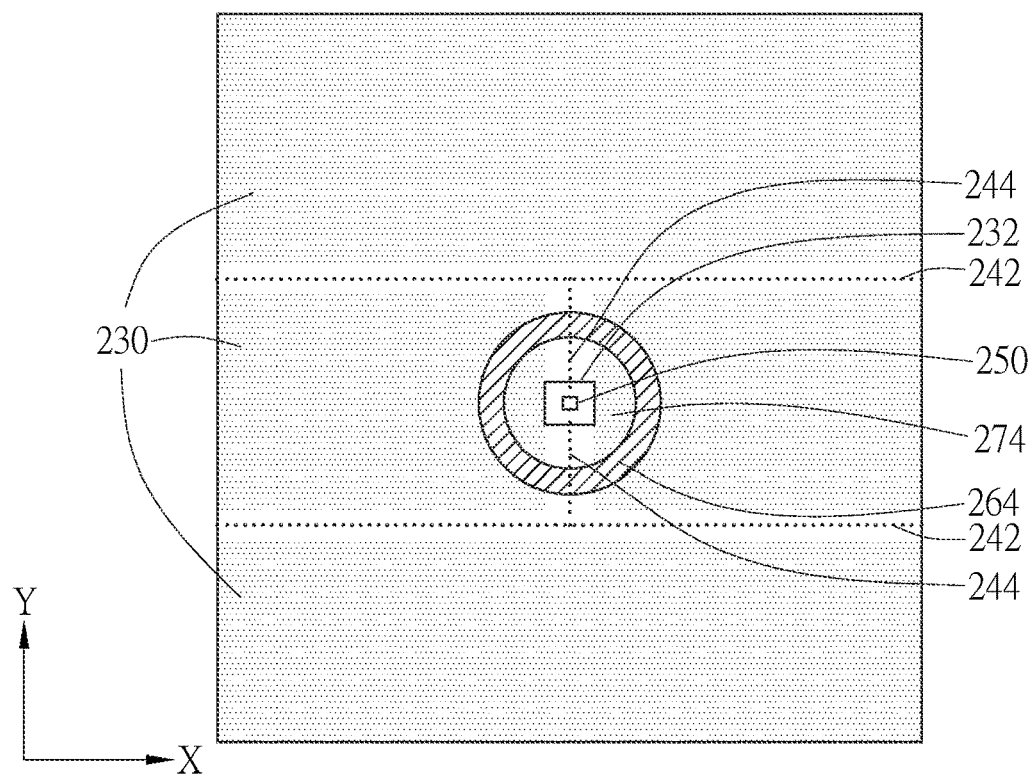

As shown in FIG. 3 and FIG. 3D, the reflective layer 230 is disposed at one side of the light guide sheet 220 opposite to the mask film 210 (e.g. the lower side) and configured to reflect light leaking from the bottom surface of the light guide sheet 220 back to the light guide sheet 220. Specifically, the reflective layer 230 can be a reflective film made of reflective materials (e.g. metal foil), a layer of reflective material coated on a non-reflective film, or a plastic film doped with reflective particles (e.g. PET film doped with reflective particles), but not limited thereto. In an embodiment, the reflective layer 230 can be a reflective coating (such as a white ink coating) coated on the upper surface of the driving circuit board 240, and the reflectivity of the reflective layer 230 is preferably larger than 80%, but not limited there. The opening 232 of the reflective layer 230 can be a through hole penetrating through the layer body of the reflective layer 230 or can be a portion of the upper surface of the driving circuit board 240 on which the light-emitting element 250 is disposed without the reflective coating. As shown in FIG. 3D, a bottom glue 264 is disposed on the top surface of the reflective layer 230 (or the bottom surface of the light guide sheet 220) and located around the light source hole 222. Specifically, the bottom glue 264 is configured to connect the light guide sheet 220 and the reflective layer 230 and located around the light hole 102, so the light guide sheet 220, the reflective layer 230, and the light-emitting element 250 can be positioned by the bottom glue 264 to enhance the optical coupling stability. Moreover, the bottom glue 264 can be formed by optical materials, which are light permeable and have a refractive index closer to that of the light guide sheet 220 than the air. As such, light reflected from the reflective layer 230 can enter the light guide sheet 220 at a relatively higher proportion and then propagates in the light guide sheet 220 by total reflection. Moreover, the top glue 262 and the bottom glue 264 can be formed by the same or different adhesive materials, such as water-based glues, but not limited thereto. The bottom glue 264 is spaced apart from the edge of light source hole 222 of the light guide sheet 220 (or the opening 232) to form a bottom clearance region 274 therebetween, i.e., the region around the light source hole 222 without the bottom glue 264. As shown in FIG. 3D, when the reflective layer 230 is the reflective coating formed on the upper surface of the driving circuit board 240, the opening 232 can be a portion of the upper surface of the driving circuit board 240 without the bottom glue 264 and without the reflective layer 230.

The driving circuit board 240 further includes one or more main wirings 242 and one or more sub-wirings 244. For example, two main wirings 242 respectively provide high/low potentials, and two sub-wirings 244 respectively extend from the two main wirings 242, so the light-emitting element 250 is electrically connected to the main wirings 242 via the sub-wirings 244. Moreover, a light absorption layer (not shown) can be disposed under the reflective layer 230 and configured to absorb the light passing through the reflective layer 230.

Referring to FIG. 2 again, the layout design of the top glue 262 and the bottom glue 264 will be further described. As shown in FIG. 2, in a stacked direction of the baseplate 10, the mask film 210, the light guide sheet 220, and the reflective layer 230 (e.g. Z-axis direction), at least one of the top glue 262 and the bottom glue 264 overlaps the first coating 212. For example, only the top glue 262, only the bottom glue 264, or both of the top glue 262 and the bottom glue 264 overlaps the first coating 212 in the stacked direction. In an embodiment, as shown in the figure, the vertical projection of the top glue 262 or the bottom glue 264 on the mask film 210 can fall within the first coating 212 (e.g. the first main coating region 212a). As described above, the top glue 262 or the bottom glue 264 is disposed surrounding the light source hole 222, so the top clearance region 272 is formed between the top glue 262 and the edge 2222 of the light source hole 222 of the light guide sheet 220, and the bottom clearance region 274 is formed between the bottom glue 264 and the edge 2222 of the light source hole 222 of the light guide sheet 220. In this embodiment, the top clearance region 272 is the top surface portion of the light guide sheet 220 around the light source hole 222 without the top glue 262, and the bottom clearance region 274 is the bottom surface portion of the light guide sheet 220 around the light source hole 222 without the bottom glue 264. From another aspect, the top clearance region 272 can be the lower surface portion of the mask film 210 around the light source hole 222 of the light guide sheet 220 without the top glue 262, and the bottom clearance region 274 can the upper surface portion of the reflective layer 230 (or the driving circuit board 240) without the bottom glue 264. As such, the top glue 262 or the bottom glue 264 can be prevented from entering the light source hole 222 to interfere with light output or from overlapping the adhesive layer 252 which fixes the light-emitting element 250 to unnecessarily increase the stacked height. In other words, with the arrangement of the top clearance region 272 and/or the bottom clearance region 274, at least one of the top glue 262 and the bottom glue 264 does not overlap the adhesive layer 252 (which fixes the light-emitting element 250) in the stacked direction (such as Z-axis direction), so as to effectively prevent the unnecessary increase of the stacked height. Preferably, the top glue 262 and the bottom glue 264 both do not overlap the adhesive layer 252 in the stacked direction.

In an embodiment, the bottom clearance region 274 is preferably larger than the top clearance region 272. For example, the distance between the bottom glue 264 and the edge 2222 of the light source hole 222 is larger than the distance between the top glue 262 and the edge 2222 of the light source hole 222 to prevent the bottom glue 264 and/or the reflective layer 230 from outputting light upward, so as to reduce the amount and chance of light outputting from the central region (e.g. the light hole 102), to increase the recycle of light from the central region, and increase the proportion of light traveling along the transverse (or horizontal) direction.

Moreover, since the first main coating region 212a of the first coating 212, which overlaps the light hole 102 and extends to the inner rib 104, overlaps the top glue 262 and/or the bottom glue 264, so the top clearance region 272 and the bottom clearance region 274, which are adjacent to the light source hole 222, also overlap the first main coating region 212a of the first coating 212 and even further overlaps the inner rib 104. In other words, at least one of the top glue 262 and the bottom glue 264 (preferably both of them) overlaps the first main coating region 212a and the inner rib 104 in the stacked direction (such as Z-axis direction), so the top clearance region 272 and the bottom clearance region 274 also overlap the first main coating region 212a. In an embodiment, the diameter of the portion of the first coating 212 covering right above the light source hole 222 (i.e., the first main coating region 212a) is preferably larger than the diameter of the top glue 262. For example, the first main coating region 212a preferably substantially extends under the whole inner rib 104, so the first main coating region 212a has a larger reflective area to effectively direct the central light to the transverse (horizontal) direction, but not limited thereto.

As shown in FIG. 2, the light guide sheet 220 has a plurality of light-exit portions 228, which is configured to direct the light upward out of the light guide sheet 220. For example, the plurality of light-exit portions 228 is disposed on the bottom surface of the light guide sheet 220 and preferably corresponds to the peripheral holes 102'. The light-exit portion 228 can be any suitable optical microstructure, so when the light encounters the light-exit portion 228, the light will scatter upward out of the light guide sheet 220. Specifically, the vertical projection of the plurality of light-exit portions 228 on the baseplate 10 preferably does not overlap the inner rib 104 to form an exit-free region 226. In this embodiment, the exit-free region 226 preferably corresponds to the vertical projections of the inner rib 104 and the light hole 102 on the light guide sheet 220. From another aspect, the plurality of light-exit portions 228 is preferably not disposed in the top clearance region 272 and the bottom clearance region 274 to reduce the chance and amount of light outputting from the light hole 102, increase the recycle of light from the central region, and increase the proportion of light traveling along the transverse (horizontal) direction.

Referring to FIG. 2, the transverse propagation and recycle of light of the illuminated keyswitch structure of the invention will be further described. As shown in FIG. 2, since the first coating 212 is closer to the light guide sheet 220 than the second coating 214 is and covers right above the light source hole 222, when the light emitted from the light-emitting element 250 toward the light hole 102 encounters the first coating 212 (i.e., the first main coating region 212a), most of the light will be reflected from the first coating 212 into the light guide sheet 220 due to the presence of the top clearance region 272. Since the light-exit portions 228 are not disposed in the exit-free region 226 of the light guide sheet 220 (e.g. the region corresponding to the light hole 102 and the inner rib 104), the light entering the light guide sheet 220 will be repeatedly reflected in the light guide sheet 220 along the transverse direction. Even when a portion of light is reflected to the top glue 262 (or the bottom glue 264) and emitted out of the light guide sheet 220, because the top glue 262 (or the bottom glue 264) overlaps the first coating 212 and the reflective layer 230 in the stacked direction, the light can be reflected back to the light guide sheet 220 to effectively achieve the light recycle and transverse propagation, not only reducing the amount of light output from the light hole 102 (i.e., preventing the central character of the keycap 12 from being too bright), but also promoting the light output from the peripheral portion of the keycap 12 (i.e., enhancing the luminance uniformity). Moreover, the size of the portion of the second coating 214 located in the light hole 102 (i.e., the second main coating region 214a) can be modified based on the desired light output from the light hole 102 to at least partially block the light that passes through the first coating 212, so as to further modulate the luminance uniformity. In addition, since the light-exit portions 228 are disposed corresponding to the peripheral holes 102', and the first coating 212 can be further disposed corresponding to the bridge ribs 106, the light emitted from the light guide sheet 220 toward the bridge ribs 106 can be reflected from the first coating 212 back into the light guide sheet 220 and propagates to the light-exit portions 228 to be emitted out of the peripheral holes 102'. As such, the amount of light output from the peripheral holes 102' can be increased to enhance the luminance uniformity.

Moreover, the reflective layer 230 can be provided with microstructures (not shown), which are disposed further away from the light-emitting element 250 and configured to guide the light upward. When the microstructures are disposed to overlap the light-exit portions 228 of the light guide sheet 220 in the stacked direction, the light output can be increased. When the microstructures are disposed to overlap the non-light exit portion of the light guide sheet 220 in the stacked direction, such as overlapping the bridge rib 106 of the baseplate 10, the recycle of light can be facilitated.

It is noted that when the illuminated keyswitch structure of the invention is applied to the keycap with characters mostly located at corners, only small amount of light (or even no light) directly emitted upward from the light-emitting element 250 is required, so the size of the light hole 102 of the baseplate 10 can be reduced, or the light hole 102 can even be omitted, but not limited thereto. In another embodiment, by increasing the size of the portion of the first coating 212 that covers right above the light-emitting element 250 (such as the first main coating region 212a) or by forming the first coating 212 with metal materials, the reflectivity can be promoted, the amount of light propagating along the transverse direction can be increased, and the brightness at the peripheral portion (e.g. corners) of the keycap can be enhanced.

FIG. 4A to FIG. 10B are schematic plan views of the coating layout in various embodiments of the invention, wherein the coating layout of FIG. 4A corresponds to the arrangement of the first main coating region 212a, the second main coating region 214a, and the plurality of second coating sub-regions 214b of FIG. 3B. As shown in FIG. 4A to FIG. 8B, FIG. 10A, and FIG. 10B, the vertical projection of the light source hole 222 on the mask film 210 is preferably located within the first main coating region 212a and the second main coating region 214a. In other words, the vertical projection of the light-emitting element 250 on the light guide sheet 220 is preferably located (falls) within the vertical projection of the first main coating region 212a and the vertical projection of the second main coating region 214a on the light guide sheet. As shown in FIG. 4A, FIG. 8A, FIG. 9A, FIG. 9B, and FIG. 10A, the vertical projection of the second main coating region 214a and the vertical projection of the plurality of second coating sub-regions 214b on the first coating 212 are completely located within the first main coating region 212a, so the first main coating region 212a overlaps the plurality of intermediary regions 215. In other words, the coating material configured to reflect light not only overlaps the second main coating region 214a and the plurality of second coating sub-regions 214b to substantially completely fill in the plurality of intermediary regions 215, but also further extends outward to surround the plurality of second coating sub-regions 214b. As such, the mask film 210 can have a larger reflective region to facilitate the recycle of light during the light propagation.

FIG. 4B is a variant embodiment of FIG. 4A, wherein the vertical projection of the second main coating region 214a on the first coating 212 is completely located within the first main coating region 212a, and the vertical projection of the plurality of second coating sub-regions 214b on the first coating 212 is at least partially located outside of the first main coating region 212a. With such a configuration, the first main coating region 212a partially overlaps the plurality of intermediary regions 215. In other words, the coating material configured to reflect light not only overlaps the second main coating region 214a, but also extends outward to partially overlap the second coating sub-regions 214b and partially fill in the plurality of intermediary regions 215, so part of the plurality of intermediary regions 215, which is away from the second main coating region 214a, forms the light permeable region 218 (i.e., the region of the light permeable film of the mask film 210 without the first coating 212 and the second coating 214). Accordingly, the average light transmittance of the light modulation region of FIG. 4B will be larger than that of FIG. 4A. In other words, compared with FIG. 4A, the character (symbol) on the keycap corresponding to the light source hole 222 of FIG. 4B will be brighter.

FIG. 5A is another variant embodiment of FIG. 4A. As shown in FIG. 5A, in this embodiment, the plurality of second coating sub-regions 214b are disposed along the periphery of the second main coating region 214a, so a first intermediary region 215a of the plurality of intermediary regions 215 is larger than the rest of the plurality of intermediary regions 215. For example, the first intermediary region 215a can be a sector region, which is approximate to one quarter (¼) of a circle, which is larger than the rest triangle-like intermediary regions 215. From another aspect, the distance (or space) between the second coating sub-regions 214b on two opposite sides of the first intermediary region 215a is larger than the distance (or space) between the second coating sub-regions 214b on two opposite sides of the intermediary region 215. With such a configuration, compared with FIG. 4A, the character (symbol) on the keycap corresponding to the first intermediary region 215a of FIG. 5A will be brighter. In other words, the first intermediary region 215a can be a region lacking one or more second coating sub-regions 214b (such as 3 in this embodiment) in a specific angle range (such as about 45 degrees), so as to increase the light output at the specific angle range.

FIG. 5B is a variant embodiment of FIG. 4B and corresponds to FIG. 5A. As shown in FIG. 5B, in this embodiment, the first intermediary region 215a can be a sector region approximate to one half (½) of a circle, which is larger than the first intermediary region 215a of FIG. 5A. For example, the first intermediary region 215a can be a region lacking one or more second coating sub-regions 214b (such as 7 in this embodiment) in a specific angle range (such as about 180 degrees), so as to increase the light output at the specific angle range. With such a configuration, compared with FIG. 4B, the character (symbol) on the keycap corresponding to the first intermediary region 215a of FIG. 5B will be brighter. In other words, the invention can modify the light transmittance of the light modulation region by modulating the size of the first main coating region 212a as well as the number of the second coating sub-regions 214b (or the size of the intermediary regions 215).

Figure 6B:
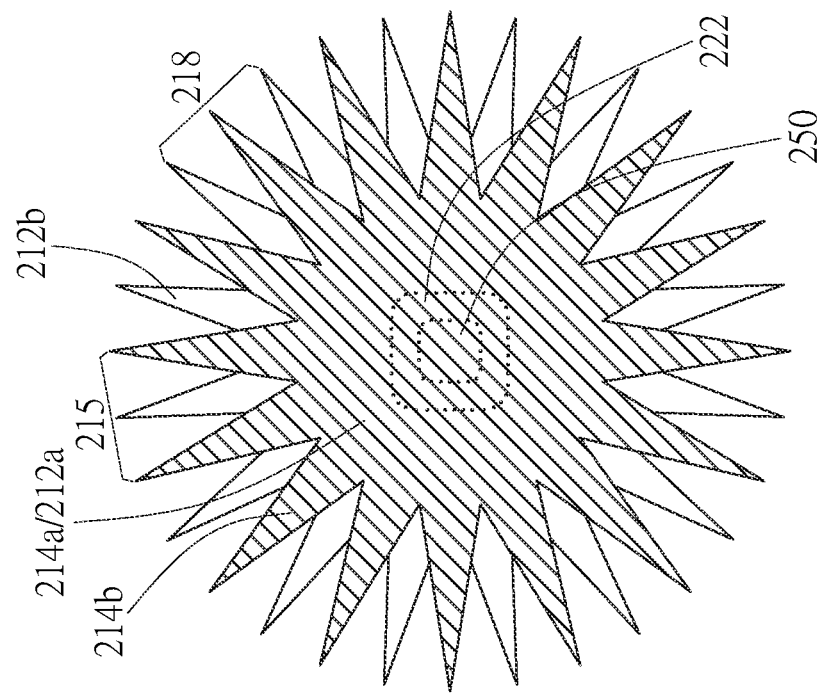
Figure 6A:
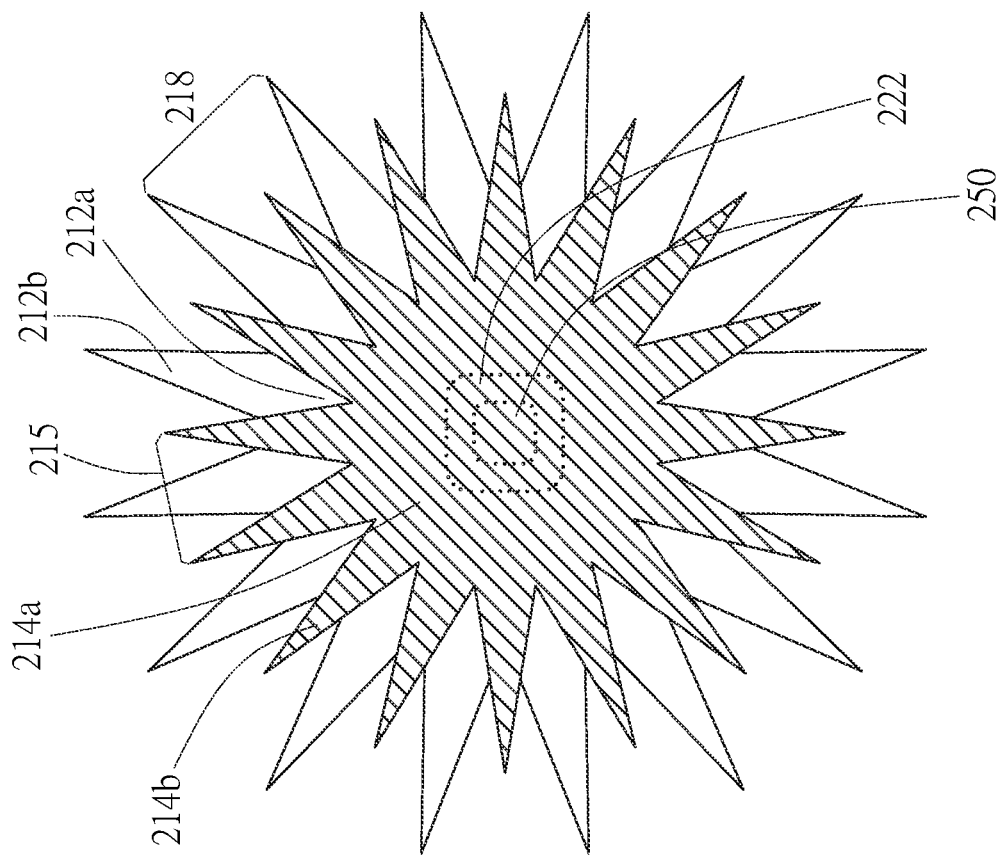

FIG. 6A and FIG. 6B are variant embodiments of FIG. 4B. As shown in FIG. 6A and FIG. 6B, the first coating 212 further includes a plurality of first coating sub-regions 212b. The plurality of first coating sub-regions 212b extends outward from the first main coating region 212a and is arranged along the periphery of the first main coating region 212a and disposed in the plurality of intermediary regions 215 to form a plurality of light permeable regions 218 between the plurality of first coating sub-regions 212b. Specifically, according to practical applications, the first coating sub-region 212b may have the same or different shape and/or size as the second coating sub-region 214b. As shown in FIG. 6A and FIG. 6B, the first coating sub-region 212b has a triangular shape similar to the second coating sub-region 214b, so the first main coating region 212a and the plurality of first coating sub-regions 212b also constitute a star-shaped pattern. In the embodiment of FIG. 6A, the plurality of first coating sub-regions 212b extends outward beyond the plurality of second coating sub-regions 214b. For example, the first main coating region 212a and the second main coating region 214a can be concentric circles with different radii, and the radius of the first main coating region 212a is larger than the radius of the second main coating region 214a. In this embodiment, the radius of the plurality of first coating sub-regions 212b (i.e., distance between the apex of the first coating sub-region 212b to the center of the first main coating region 212a) is larger than the radius of the plurality of second coating sub-regions 214b (i.e., distance between the apex of the second coating sub-region 214b to the center of the second main coating region 214a). In the embodiment of FIG. 6B, the plurality of first coating sub-regions 212b extends outward not beyond the plurality of second coating sub-regions 214b. For example, the first main coating region 212a and the second main coating region 214a are concentric circles with the same radius, and the first coating sub-regions 212b and the second coating sub-regions 214b are identical in number, size, and shape, so the radius of the first coating sub-region 212b is substantially equal to the radius of the second coating sub-region 214b. From another aspect, in FIG. 6B, the first coating 212 and the second coating 214 can be concentrically arranged and have the same star-shaped pattern. The first coating 212 is rotated with respect to the second coating 214, so the first coating sub-regions 212b are located in the intermediary regions 215, and the plurality of first coating sub-regions 212b and the plurality of second coating sub-regions 214b are alternately disposed, but not limited thereto. According to practical applications, in another embodiment (not shown), the radius of the first coating sub-region 212b can be smaller than the radius of the second coating sub-region 214b.

Figure 7:
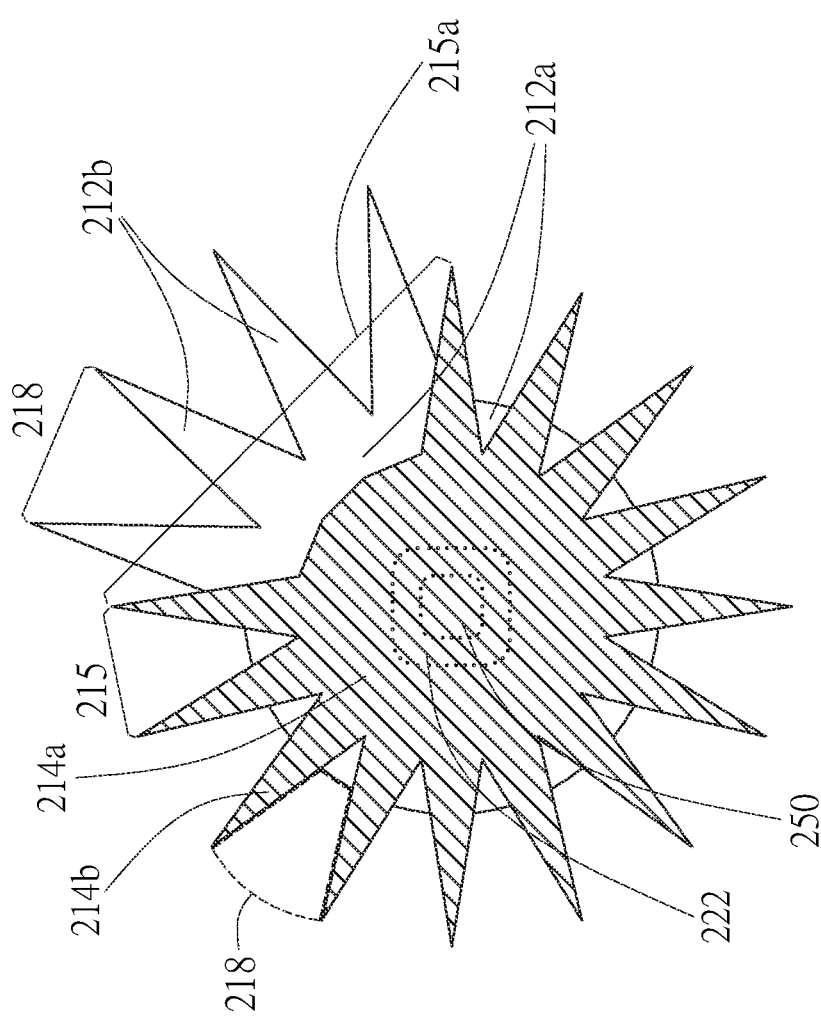

FIG. 7 is another variant embodiment of FIG. 4B. In this embodiment, the plurality of second coating sub-regions 214b are configured similar to FIG. 5A, i.e., the first intermediary region 215a is larger than the rest of the plurality of intermediary regions 215. The first main coating region 212a and the second main coating region 214a are configured similar to FIG. 4B, i.e., the vertical projection of the second main coating region 214a on the first coating 212 is completely located within the first main coating region 212a, and the vertical projection of the plurality of second coating sub-regions 214b on the first coating 212 is at least partially located outside of the first main coating region 212a, so part of the plurality of intermediary regions 215 away from the second main coating region 214a forms the light permeable regions 218. In this embodiment, the plurality of first coating sub-regions 212b extends outward from the first main coating region 212a and is arranged along the periphery of the first main coating region 212a only in the first intermediary region 215a, so as to form the plurality of light permeable regions 218 between the plurality of first coating sub-regions 212b and further to modulate the light output in the first intermediary region 215a.

Figure 8B:
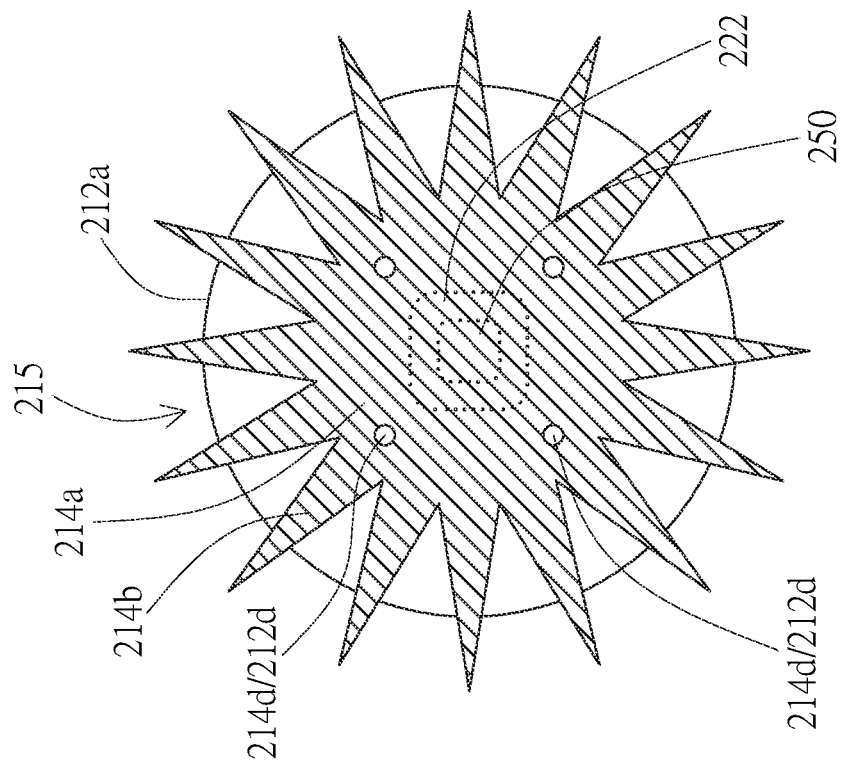
Figure 8A:
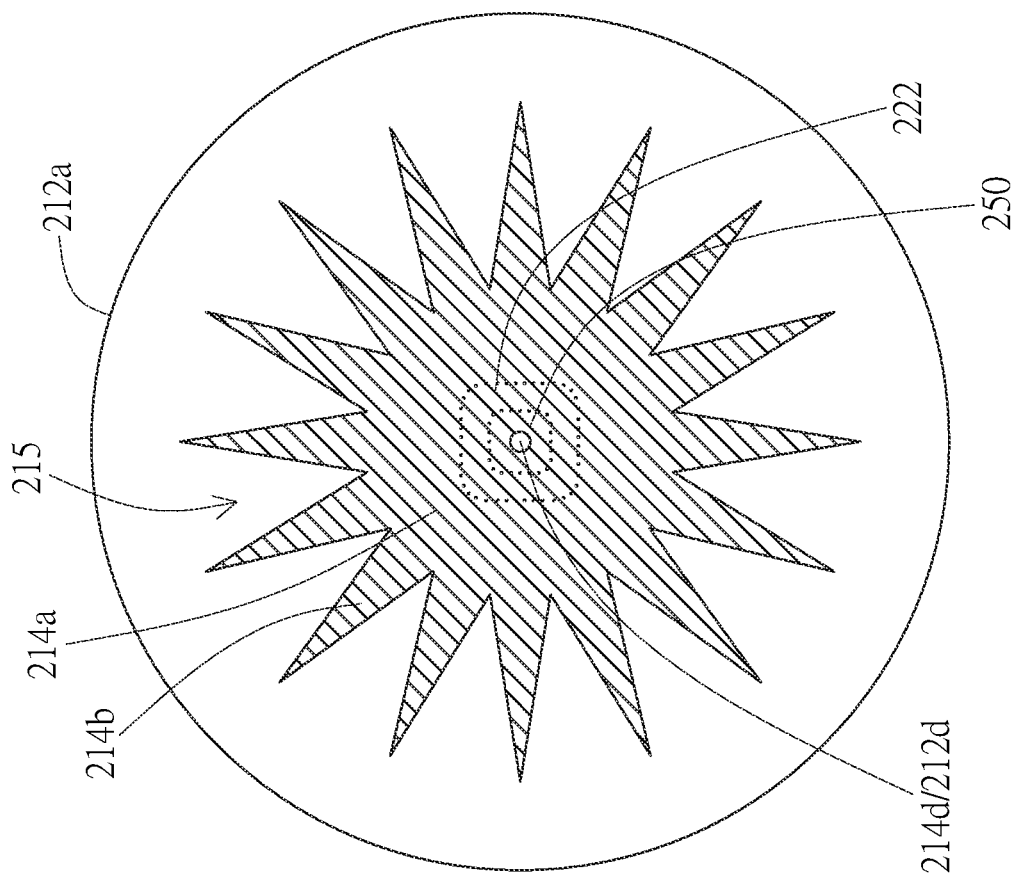

FIG. 8A and FIG. 8B are variant embodiments of FIG. 4A and FIG. 4B, respectively. In the embodiments, the second coating 214 has one or more second holes 214d, and the second hole 214d is disposed in the second main coating region 214a to expose the underlying first main coating region 212a. In another embodiment, the first coating 212 can have one or more first holes 212d, and the first hole 212d overlaps the second hole 214d, so as to expose the light permeable film of the mask film 210. In other words, the light output can be slightly increased at a predetermined location by forming holes or openings in the second coating 214, and the light output can be further increased at the predetermined location by further forming corresponding holes or openings in the first coating 212. The number, location of the second hole 214d (and the first hole 212d) can be modified according to practical applications. As shown in FIG. 8A, the second hole 214d (and the first hole 212d) is disposed in the second main coating region 214a (and the first main coating region 212a), and the vertical projection of the second hole 214d (and the first hole 212d) on the light guide sheet 220 is located within the light source hole 222. As shown in FIG. 8B, a plurality of second holes 214d (and the first holes 212d) is disposed in the second main coating region 214a (and the first main coating region 212a), and the vertical projection of the second holes 214d (and the first hole 212d) on the light guide sheet 220 is located outside of the light source hole 222. For example, four second holes 214d (and the first holes 212d) can be disposed outside of the light source hole 222 and correspond to four corners of the light source hole 222, but not limited thereto.

Figure 9B:
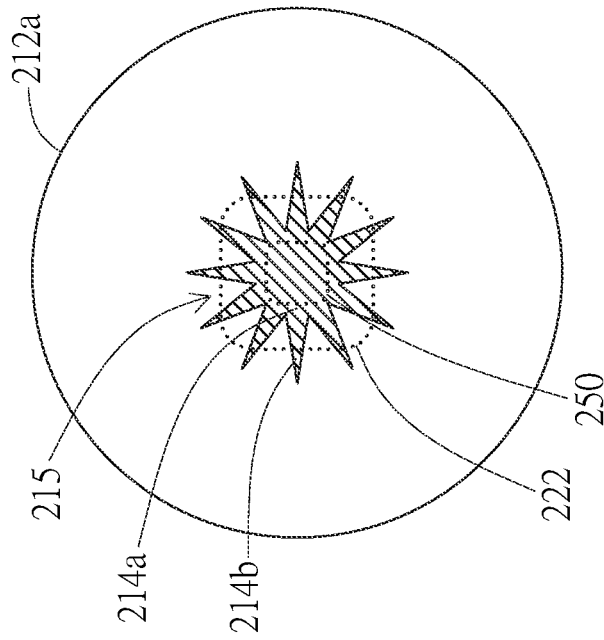
Figure 9A:
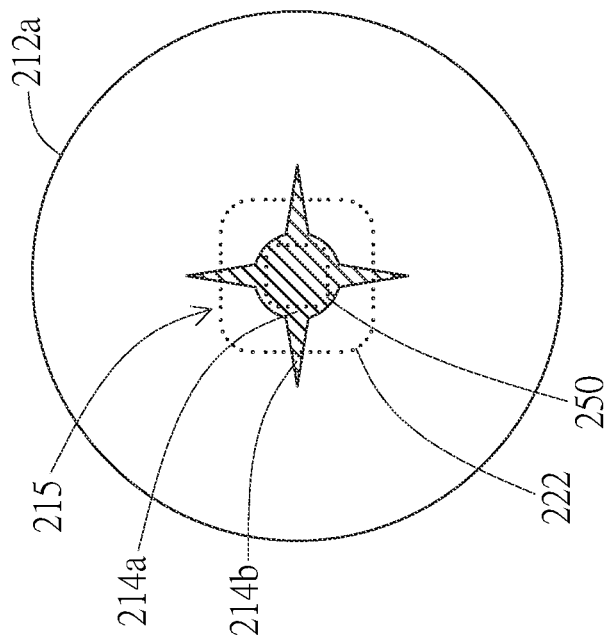

As shown in the embodiments of FIG. 9A and FIG. 9B, the vertical projection of the second main coating region 214a on the light guide sheet 220 is located within the light source hole 222, so the plurality of second coating sub-regions 214b at least partially extends beyond the light source hole 222 of the light guide sheet 220, and the vertical projection of the light-emitting element 250 on the light guide sheet 220 is located within the vertical projection of the second main coating region 214a on the light guide sheet 220. In other words, by adjusting (such as decreasing) the size of the second main coating region 214a, the light output from the light hole 102 can be adjusted (such as increased). As shown in the embodiment of FIG. 9A, the number of the second coating sub-regions 214b is greatly reduced. For example, four second coating sub-regions 214b are respectively disposed at four sides of the light-emitting element 250, and the second coating sub-regions 214b overlap the light source hole 222. In other words, the second coating sub-regions 214b can extend beyond the light source hole 222, so the intermediary regions 215 is at least partially located within the light source hole 222. In the embodiment of FIG. 9B, the number of the second coating sub-region 214b is less than that shown in FIG. 4A, so the second main coating region 214a and the plurality of second coating sub-regions 214b constitute a star-shaped pattern with less rays, but not limited thereto. In this embodiment, the second coating sub-region 214b can extend beyond the light source hole 222, so the intermediary regions 215 are at least partially located within the light source hole 222.

Figure 10B:
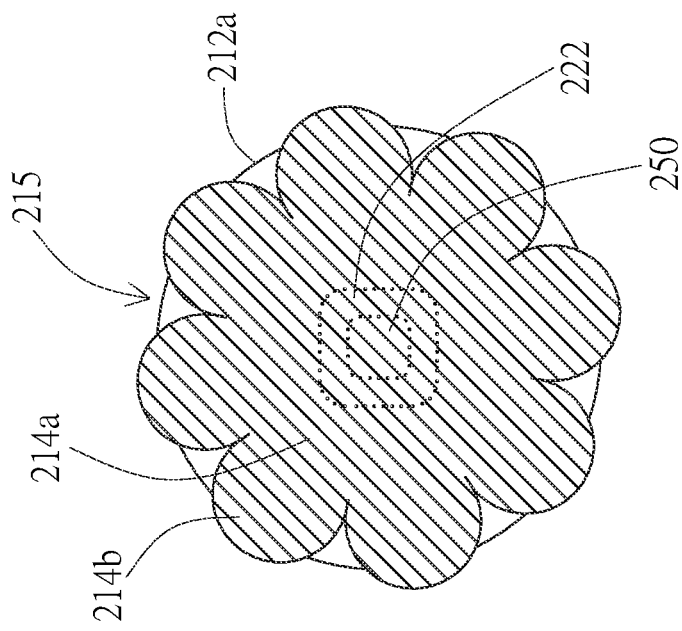
Figure 10A:
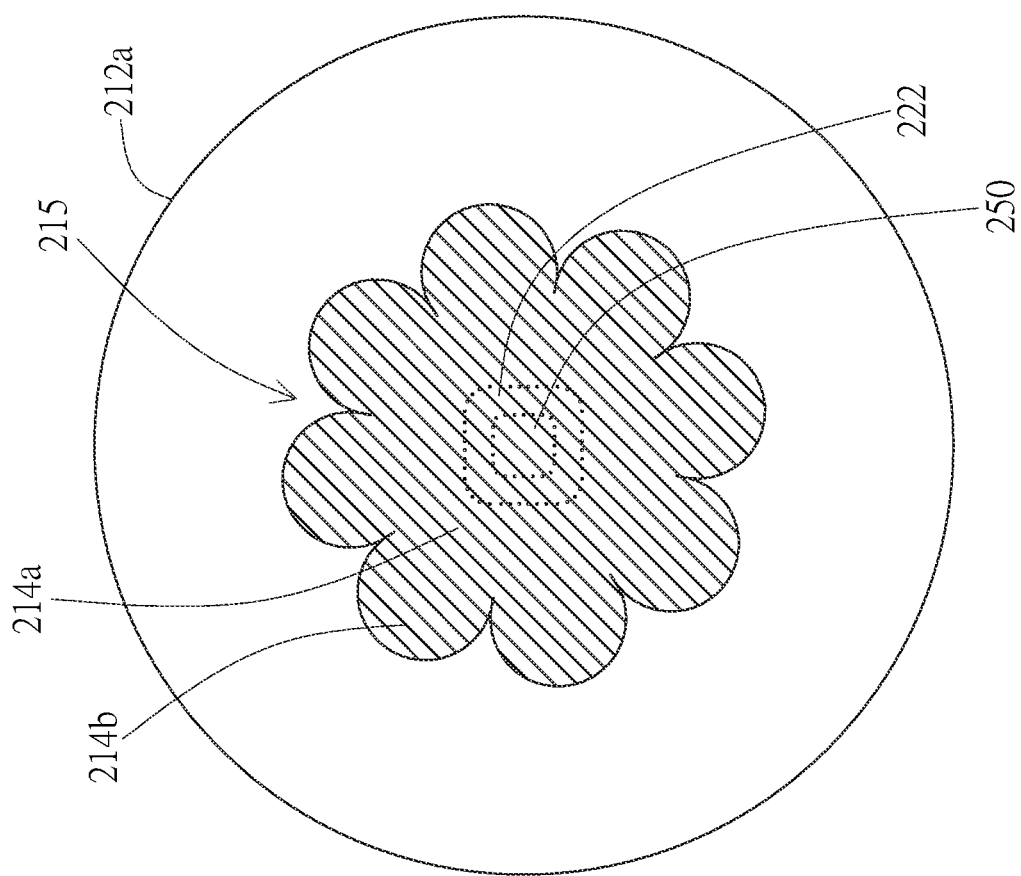

FIG. 10A and FIG. 10B are variant embodiments of FIG. 4A and FIG. 4B, respectively. As shown in FIG. 10A and FIG. 10B, the second coating sub-region 214b has a petal shape, so the second coating 214 has a flower pattern. In other words, the second coating sub-region 214b can be an arch-shaped light-blocking region, and the plurality of second coating sub-regions 214b is connected with one another, but not limited thereto. In other embodiments, the plurality of second coating sub-regions 214b can be connected only to the second main coating region 214a, and the plurality of second coating sub-regions 214b are disposed adjacent with each other, but not connected at two sides.

It is noted that in the embodiments of FIG. 4A, FIG. 4B, FIG. 6A, FIG. 6B, FIG. 8A to FIG. 10B, the plurality of second coating sub-regions 214b is preferably disposed symmetrically with respect to the light-emitting element 250, but not limited thereto. Moreover, the second hole 214d (and the first hole 212d) can be formed at any suitable position in any of the previous embodiments.

In the above embodiments, though different coating materials (or light-blocking materials) are provided to form the first coating 212 and the second coating 214, respectively, but not limited thereto. According to practical applications, by adjusting the thickness of the coating material, the light-blocking effect can be modulated. For example, when the thickness of the white ink coating is sufficiently thick, the white ink coating can not only have the light-reflecting effect, but also has a considerable light-blocking effect, so the white ink coating can function as a coating, which is configured to substantially reflect light and substantially block the light at the same time. In other words, in another embodiment, the second coating 214 can be made of a coating material the same as the first coating 212, such as the white ink coating. From another aspect, in the coating configuration of FIG. 4A to FIG. 10B, the overlapping region of the first coating 212 and the second coating 214 can be considered as the thick coating region, which is configured to substantially reflect and block the light, and the non-overlapping region of the first coating 212 and the second coating 214 can be considered as the thin coating region, which is configured to reflect most of the light and allow a small portion of light to pass therethrough. As such, a single coating material (or light-blocking material) can achieve the light modulation effect similar to the above embodiments. Specifically, the dual coating design of the invention can be achieved by the following ways: (1) the first coating 212 and the second coating 214 can be two coatings of different light-blocking materials (e.g. one is the white ink coating, and the other one is black ink coating); (2) the first coating 212 and the second coating 214 can be two coatings of the same light-blocking material (e.g. both are the white ink coating), i.e., can be considered as a single coating having regions different in thickness, but not limited thereto. In another embodiment, when the second coating 214 is made of the same light-blocking material as the first coating 212 (i.e., the reflective coating material), the first coating 212 can be disposed only in the intermediary regions 215 and does not overlap the second coating 214, so the first coating 212 and the second coating 214 can be integrated into a single coating with a uniform thickness.

Figure 11B:
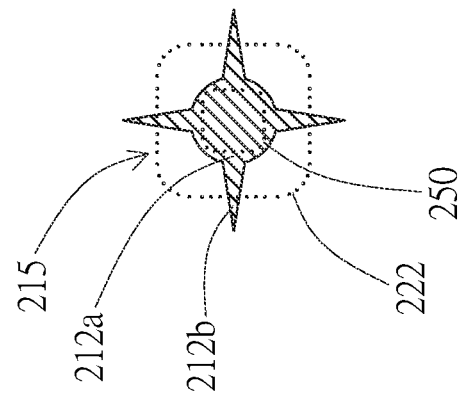
FIG. 11A and FIG. 11B are schematic plan views of the first coating of the backlit module in different embodiments of the invention.
Figure 11A:
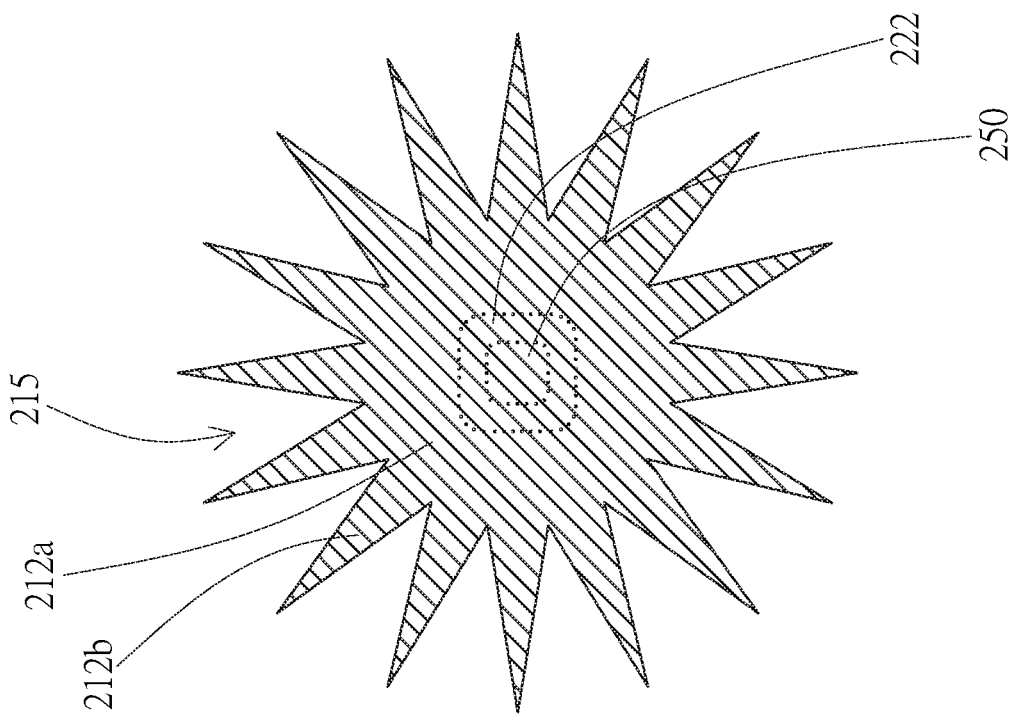

In order to enhance the light output from the light hole 102, in another embodiment, the first coating 212 can replace the second coating 214, so the mask film 210 can have only the first coating 212 for substantially reflecting light, and the first coating 212 can have a coating layout the same as or similar to the second coating 214 of any of FIG. 4A to FIG. 10. As shown in FIG. 11A, the first coating 212 can have a star-shaped pattern the same as the second coating 214 of FIG. 4A. Specifically, the first coating 212 includes the first main coating region 212a and the plurality of first coating sub-regions 212b. In this embodiment, the first main coating region 212a can be a circle-shaped light-blocking region, and the plurality of first coating sub-regions 212b is triangle-like light-blocking sub-regions arranged along the circumference of the circle-shaped first main coating region 212a, so the first main coating region 212a and the plurality of first coating sub-regions 212b constitute a star-shaped pattern, and the intermediary region 215 is disposed between two adjacent first coating sub-regions 212b. In this embodiment, the intermediary region 215 is a region of the light permeable film of the mask film 210 without the coating material (i.e., light permeable region) to allow the light to directly pass therethrough. The first main coating region 212a and the plurality of first coating sub-regions 212b are disposed corresponding to the light hole 102 and the light source hole 222. For example, the vertical projection of the first main coating region 212a on the baseplate 10 is preferably located within the light hole 102, and the vertical projection of the light source hole 222 on the baseplate 210 is located within the first main coating region 212a, so the first main coating region 212a preferably substantially completely covers the light-emitting element 250, but not limited thereto. As shown in FIG. 11B, the first coating 212 may have a star-shaped pattern the same as the second coating 214 of FIG. 9A. In this embodiment, the light-emitting element 250 and the first main coating region 212a overlap with each other in the vertical direction (or the stacked direction), and the first coating sub-region 212b at least partially extends outside of the light source hole 222 of the light guide sheet 220. Specifically, the vertical projection of the first main coating region 212a on the light guide sheet 220 is located within the light source hole 222, and the vertical projection of the light-emitting element 250 on the light guide sheet 220 is located within the vertical projection of the first main coating region 212a on the light guide sheet 220. The first coating sub-region 212b can extend beyond the light source hole 222, so the intermediary region 215 is at least partially located within the light source hole 222.

Figure 12:
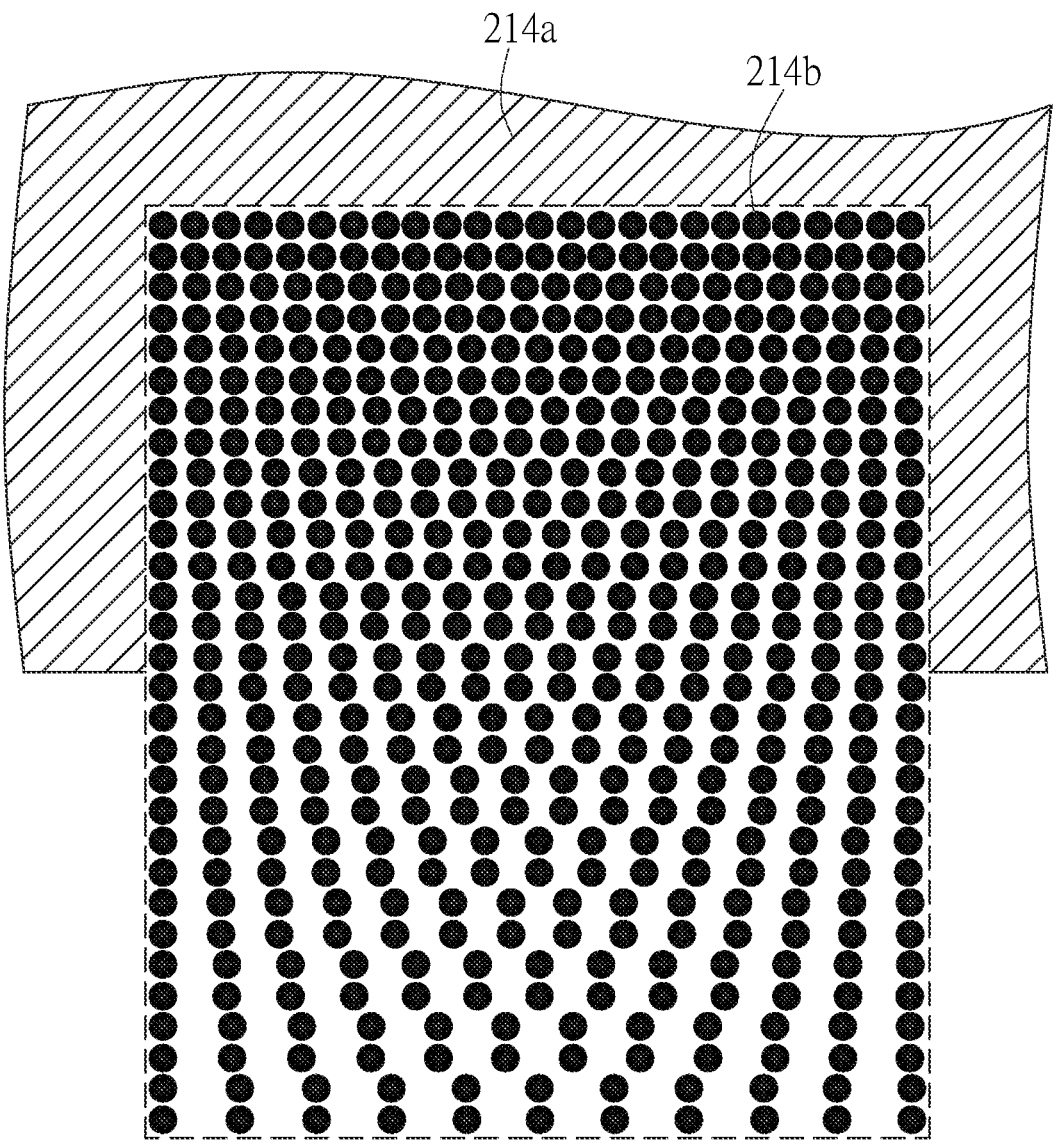
FIG. 12 is a schematic view of the second coating in a variant embodiment of the invention.

In addition, according to practical applications, the second coating sub-regions 214b can be a coating region of uniform density or non-uniform density. For example, the second coating sub-region 214b may have a gradation design by printing technology. As shown in FIG. 12, FIG. 12 illustrates in the second coating sub-region 214b, the light-blocking material is arranged in a dot configuration to form a distribution of plurality of dots in non-uniform density. In this embodiment, the second coating sub-region 214b is arranged in dots, and the distribution density of dots is gradually reduced from the inner side to the outer side. In other words, the distribution density of the second coating sub-region 214b becomes larger as closer to the second main coating region 214a and becomes smaller as extending outward along the extending direction from the second main coating region 214a, but not limited thereto. In the embodiment of FIG. 12, dots in the second coating sub-region 214b preferably do not overlap with each other, but not limited thereto. In other embodiments, according to practical applications and the optical requirements, the dots may be locally (partially) overlapped with each other. It is noted that though the second main coating region 214a and the second coating sub-region 214b of the second coating 214 is illustrated, the first coating 212 can be form as a coating region of uniform density or non-uniform density in dot configuration as described above, which will not elaborate again.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A backlit module, comprising:
   a mask film having a first coating configured to substantially reflect a light and a second coating configured to substantially block the light;
   a light guide sheet disposed at one side of the mask film, the light guide sheet having a light source hole; and
   a reflective layer disposed at one side of the light guide sheet opposite to the mask film, the reflective layer having an opening communicating with the light source hole,
   wherein the second coating comprises a second main coating region and a plurality of second coating sub-regions; the plurality of second coating sub-regions extend outward from the second main coating region and are arranged along a periphery of the second main coating region to form a plurality of intermediary regions between the plurality of second coating sub-regions; the first coating and the second coating are disposed right above the light source hole; at least a portion of the first coating is located in the plurality of intermediary regions.

2. The backlit module of claim 1, wherein the first coating comprises a first main coating region, and a vertical projection of the second main coating region and a vertical projection of the plurality of second coating sub-regions on the first coating are completely located within the first main coating region.

3. The backlit module of claim 1, wherein a first intermediary region of the plurality of intermediary regions is larger than the rest of the plurality of intermediary regions.

4. The backlit module of claim 1, wherein the second coating has a second hole, and the second hole is disposed in the second main coating region.

5. The backlit module of claim 4, wherein the first coating has a first hole overlapping the second hole.

6. The backlit module of claim 4, wherein a vertical projection of the second hole on the light guide sheet is located within the light source hole.

7. The backlit module of claim 4, wherein a vertical projection of the second hole on the light guide sheet is located outside of the light source hole.

8. The backlit module of claim 1, wherein the first coating comprises a first main coating region; a vertical projection of the second main coating region on the first coating is completely located within the first main coating region; a vertical projection of the plurality of second coating sub-regions on the first coating is at least partially located outside of the first main coating region.

9. The backlit module of claim 8, wherein a first intermediary region of the plurality of intermediary regions is larger than the rest of the plurality of intermediary regions.

10. The backlit module of claim 9, wherein the first coating further comprises a plurality of first coating sub-regions; the plurality of first coating sub-regions extends outward from the first main coating region and is arranged along a periphery of the first main coating region and disposed in the first intermediary region to form a plurality of light permeable regions between the plurality of first coating sub-regions.

11. The backlit module of claim 8, wherein the first coating further comprises a plurality of first coating sub-regions; the plurality of first coating sub-regions extends outward from the first main coating region and is arranged along a periphery of the first main coating region and disposed in the plurality of intermediary regions to form a plurality of light permeable regions between the plurality of first coating sub-regions.

12. The backlit module of claim 11, wherein the plurality of first coating sub-regions extends outward beyond the plurality of second coating sub-regions.

13. The backlit module of claim 11, wherein the first main coating region and the second main coating region are concentric circles; a radius of the plurality of first coating sub-regions is larger than or equal to a radius of the plurality of second coating sub-regions.

14. The backlit module of claim 1, further comprising:
   a driving circuit board disposed below the light guide sheet; and
   a light-emitting element fixed on the driving circuit board and located in the light source hole,
   wherein a vertical projection of the light-emitting element on the light guide sheet is located within a vertical projection of the second main coating region on the light guide sheet.

15. The backlit module of claim 14, wherein the plurality of second coating sub-regions is disposed symmetrically with respect to the light-emitting element, and the plurality of second coating sub-regions overlaps the light source hole.

16. The backlit module of claim 14, wherein the vertical projection of the second main coating region on the light guide sheet is located within the light source hole.

17. The backlit module of claim 1, wherein the second coating is made of a coating material the same as the first coating.

18. An illuminated keyswitch structure, comprising:
the backlit module of claim 1; and
a baseplate disposed over the backlit module, the baseplate having a light hole corresponding to the light source hole,
wherein the backlit module is configured to project light toward the light hole; the second coating is disposed closer to the baseplate than the first coating is; a vertical projection of the second main coating region on the baseplate is located within the light hole, and a vertical projection of the light source hole on the baseplate is located within the vertical projection of the second main coating region.

19. An illuminated keyswitch structure, comprising:
the backlit module of claim 16; and
a baseplate disposed over the backlit module, the baseplate having a light hole corresponding to the light source hole,
wherein the backlit module is configured to project light toward the light hole; the second coating is disposed closer to the baseplate than the first coating is; a vertical projection of the second main coating region on the baseplate is located within the light hole.

\* \* \* \* \*